(12) United States Patent
Shukla et al.

(10) Patent No.: US 11,961,509 B2
(45) Date of Patent: Apr. 16, 2024

(54) TRAINING A USER-SYSTEM DIALOG IN A TASK-ORIENTED DIALOG SYSTEM

(71) Applicant: Microsoft Technology Licensing, LLC, Redmond, WA (US)

(72) Inventors: Swadheen Kumar Shukla, Seattle, WA (US); Lars Hasso Liden, Seattle, WA (US); Thomas Park, Seattle, WA (US); Matthew David Mazzola, Seattle, WA (US); Shahin Shayandeh, Seattle, WA (US); Jianfeng Gao, Woodinville, WA (US); Eslam Kamal Abdelreheem, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/839,308

(22) Filed: Apr. 3, 2020

(65) Prior Publication Data

US 2021/0312904 A1 Oct. 7, 2021

(51) Int. Cl.
*G10L 15/00* (2013.01)
*G06N 3/044* (2023.01)
(Continued)

(52) U.S. Cl.
CPC ............ *G10L 15/063* (2013.01); *G06N 3/044* (2023.01); *G06N 3/049* (2013.01); *G06N 3/08* (2013.01); *G10L 15/16* (2013.01); *G10L 15/22* (2013.01); *G10L 25/30* (2013.01); *G10L 2015/0635* (2013.01); *G10L 2015/225* (2013.01)

(58) Field of Classification Search
CPC ....... G10L 15/063; G10L 15/22; G10L 25/30; G10L 15/16; G10L 2015/0635; G10L 2015/225; G06F 40/35; G06F 16/3329; G06F 8/33; G06F 8/38; G06F 40/30; G06N 3/0445; G06N 3/049; G06N 3/08; G06N 3/0427; G06N 5/022
See application file for complete search history.

(56) References Cited

U.S. PATENT DOCUMENTS 7,885,817 B2  2/2011  Paek et al.
8,954,319 B2  2/2015  Williams
(Continued)

OTHER PUBLICATIONS

"Giannone C, Bellomaria V, Favalli A, Romagnoli R. Iride R: an Industrial Perspective on Production Grade End To End Dialog System. InProceeting of the Italian Conference of Computational Linguistics (CLIC). Bari Nov. 2019." (Year: 2019).*
(Continued)

*Primary Examiner* — Douglas Godbold
*Assistant Examiner* — Parker Mayfield

(57) ABSTRACT

Methods and systems are disclosed for improving dialog management for task-oriented dialog systems. The disclosed dialog builder leverages machine teaching processing to improve development of dialog managers. In this way, the dialog builder combines the strengths of both rule-based and machine-learned approaches to allow dialog authors to: (1) import a dialog graph developed using popular dialog composers, (2) convert the dialog graph to text-based training dialogs, (3) continuously improve the trained dialogs based on log dialogs, and (4) generate a corrected dialog for retraining the machine learning.

18 Claims, 13 Drawing Sheets

(51) Int. Cl.
  *G06N 3/049* (2023.01)
  *G06N 3/08* (2023.01)
  *G10L 15/06* (2013.01)
  *G10L 15/16* (2006.01)
  *G10L 15/22* (2006.01)
  *G10L 25/30* (2013.01)

(56) References Cited

U.S. PATENT DOCUMENTS

| | | | |
|---|---|---|---|
| 9,715,496 B1* | 7/2017 | Sapoznik | G10L 15/26 |
| 9,794,199 B2 | 10/2017 | Capper et al. | |
| 10,068,174 B2 | 9/2018 | Aili et al. | |
| 10,332,518 B2* | 6/2019 | Garg | G10L 15/1815 |
| 2012/0016678 A1* | 1/2012 | Gruber | B60K 35/00 |
| | | | 704/275 |
| 2012/0173243 A1* | 7/2012 | Anand | H04M 3/4936 |
| | | | 704/270.1 |
| 2014/0149411 A1* | 5/2014 | Anand | G06F 16/35 |
| | | | 707/737 |
| 2014/0365226 A1* | 12/2014 | Sinha | G10L 15/22 |
| | | | 704/275 |
| 2016/0019290 A1* | 1/2016 | Ratnaparkhi | G06F 16/9024 |
| | | | 707/743 |
| 2016/0260029 A1 | 9/2016 | Gelfenbeyn et al. | |
| 2017/0213544 A1* | 7/2017 | Dhoolia | G06N 5/04 |
| 2017/0293834 A1 | 10/2017 | Raison et al. | |
| 2018/0089572 A1 | 3/2018 | Aili et al. | |
| 2019/0138879 A1 | 5/2019 | Hu et al. | |
| 2019/0163694 A1 | 5/2019 | Yao | |
| 2019/0340527 A1 | 11/2019 | Liden et al. | |

OTHER PUBLICATIONS

"International Search Report and Written Opinion Issued in PCT Application No. PCT/US21/020363", dated Jun. 7, 2021, 13 Pages.
"Amazon Lex", Retrieved from: https://web.archive.org/web/20200121010838/https:/aws.amazon.com/lex/, Jan. 21. 2020, 5 Pages.
"Build chatbots with no code", Retrieved from: https://web.archive.org/web/20191225013753/https:/powervirtualagents.microsoft.com/en-us/, Dec. 25, 2019, 4 Pages.
"Build natural and rich conversational experiences", Retrieved from: https://web.archive.org/web/20200204143922/ https:/dialogflow.com/, Feb. 4, 2020, 8 Pages.
"Troubleshooting Your Bot", Retrieved from: https://developer.salesforce.com/docs/atlas.en-us.bot_cookbook.meta/pot_cookbook/bot_cookbook_troubleshooting.htm, Retrieved Date: Feb. 10, 2020, 4 Pages.
"Watson Anywhere", Retrieved from: https://web.archive.org/web/20200204224854/https:/www.ibm.com/watson, Feb. 4, 2020, 5 Pages.
"Wit.ai", Retrieved from: https://wit.ai/, Retrieved Date: Jan. 11, 2020, 1 Page.
Bocklisch, et al., "Rasa: Open source language understanding and dialogue management", In Journal of Computing Research Repository, Dec. 2017, pp. 1-9.
Brown, et al., "Microsoft Bot Framework Composer", Retrieved from: https://github.com/microsoft/BotFramework-Composer, Jan. 27, 2020, 3 Pages.
Burtsev, et al., "DeepPavlov: Opensource library for dialogue systems", In Proceedings of the 56th Annual Meeting of the Association for Computational Linguistics-System Demonstrations, Jul. 15, 2018, pp. 122-127.
Gao, et al., "Neural approaches to conversational AI", In Journal of Foundations and Trends in Information Retrieval, vol. 13, No. 2-3, Feb. 21, 2019, 64 Pages.
Han, et al., "microsoft/botbuilder-dotnet", Retrieved from: https://github.com/microsoft/botbuilder-dotnet/blob/master/schemas/sdk.schema, Retrieved Date: Jan. 11, 2020, 159 Pages.
Lee, et al., "ConvLab: Multi-Domain End-to-End Dialog System Platform", In Journal of Computing Research Repository, Apr. 2019, 6 Pages.
Lei, et al., "Sequicity: Simplifying task-oriented dialogue systems with single sequence-to-sequence architectures", In Proceedings of the 56th Annual Meeting of the Association for Computational Linguistics, Jul. 15, 2018, pp. 1437-1447.
Madotto, et al., "Mem2Seq: Effectively incorporating knowledge bases into end-to-end task-oriented dialog systems", In Proceedings of the 56th Annual Meeting of the Association for Computational Linguistics (vol. 1: Long Papers), Jul. 15, 2018, 20 Pages.
Mazzola, et al., "Visualization of Training Dialogs For A Conversational Bot", Application as Filed in PCT Application No. PCT/US20/021934, Filed Date: Mar. 11, 2020, 33 Pages.
Miller, et al., "Parlai: A dialog research software platform", In Journal of Computing Research Repository, May 2017, 7 Pages.
Papangelis, et al., "Plato dialogue system: A flexible conversational AI research platform", In Journal of arXiv preprint arXiv:2001.06463, Jan. 20, 2020, pp. 1-13.
Simard, et al., "Machine teaching: A new paradigm for building machine learning systems", In Journal of Computing Research Repository, Jul. 2017, 14 Pages.
Ultes, et al., "PyDial: A Multi-domain Statistical Dialogue System Toolkit", In Proceedings of the 55th Annual Meeting of the Association for Computational Linguistics, Jul. 30, 2017, pp. 73-78.
Volkova, et al., "Lightly Supervised Learning of Procedural Dialog Systems", In Proceedings of the 51st Annual Meeting of the Association for Computational Linguistics, vol. 1, Aug. 2013, 11 Pages.
Williams, et al., "Hybrid code networks: practical and efficient end-to-end dialog control with supervised and reinforcement learning", In Journal of Computing Research Repository, Feb. 2017, 13 Pages.

* cited by examiner

TRAINING A USER-SYSTEM DIALOG IN A TASK-ORIENTED DIALOG SYSTEM

BACKGROUND

The proliferation of applications and hardware devices with personal assistants has spurred the imagination of many in the technology industry to create task-oriented dialog systems that help users complete a wide range of tasks through natural language conversations. Tasks include customer support, IT helpdesk, information retrieval, appointment booking, etc. The wide variety of tasks has created the need for a flexible task-oriented dialog development platform that can support many different use cases.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by a development interface that enables dialog authors to view error logs of user-system dialogs and facilitates intuitive and efficient revisions using machine teaching tools. The tools augment the dialog manager with exemplar conversation flows or facilitate intuitive and efficient revisions to a dialog tree. In aspects, rather than requiring the developer to re-code the dialog manager, the development interface enables automatic updates to the dialog tree (or graph) based on author revisions or via the addition of sample conversation flows so as to efficiently improve interactions between users and virtual assistants in a variety of scenarios.

Systems and methods described herein relate to generating and improving a dialog via a development interface that leverages machine teaching to improve user-system dialogs. In aspects, a "user-system dialog" may refer to any user interaction with a computing device. For instance, the user may interact with the computing device via an application (e.g., a virtual assistant application) that receives user input (e.g., in the form of a user utterance, keyed input, mouse input, eye-gaze input, or any other mode of user input) and generates a response or output based on a dialog manager.

Conventionally, a development platform for dialog design uses rule-based dialogs, which expresses a dialog as a dialog flow, which is often a finite state machine with nodes representing dialog activities (system actions) and edges representing conditions (dialog states that represent the previous user-system interactions). The rule-based dialog suffers from two major problems. First, these systems can have difficulty handling complex dialogs. Second, updating a rule-based dialog to handle unexpected user responses and off-track conversations is often difficult due to the rigid structure of the dialog flow, the long-tail (sparseness) of user-system dialogs, and the complexity in jumping to unrelated parts of the flow. On the other hand, rule-based dialogs allow explicit control over the flow of dialog based on the rules, and do not require dialog data for training because all the dialog scenarios are defined based on rules.

In contrast, a machine learning model for dialog design supports complex scenarios through training the machine learning system using a recurrent neural network, for example. This model has the advantage of learning directly from sample dialogs, which are accessible to non-experts, but it is difficult to maintain a system represented by such sample dialogs. Moreover, implementing design changes, e.g., adding a step to ask another question, presents challenges because all of the training examples would need to be updated. There has been an increasing need to combine the best of both technologies for improving a user-system dialogs.

The system and methods described herein address the issue of generating and improving user-system dialogs so that the system response or output to the user is improved both in a predefined subject domain and in a general subject domain. For a predefined subject domain, where the dialog interactions are more narrowly defined, the system may not respond appropriately when the user input is unexpected or "off-script." For a general subject domain, the system may need to respond to highly-variable user input in terms of alternative expressions as well as user intent. To provide improvements in either scenario, the systems and methods described herein combine the development ease of a rule-based dialog system with the robust responsiveness of machine learning by converting a rule-based dialog tree (or graph) into a text-based set of dialogs suitable for machine learning or teaching. In particular, the system enables identification of one or more faults in a log dialog of user-system interactions. The identified faults are then presented to the developer for selecting a more accurate system response through machine teaching tools, which may then automatically be added to the rule-based dialog tree.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 5A-E illustrate examples of revising a dialog based on a graph-based dialog and a log dialog according to an example system with which the disclosure may be practiced in accordance with aspects of the present disclosure.

Figure 6:
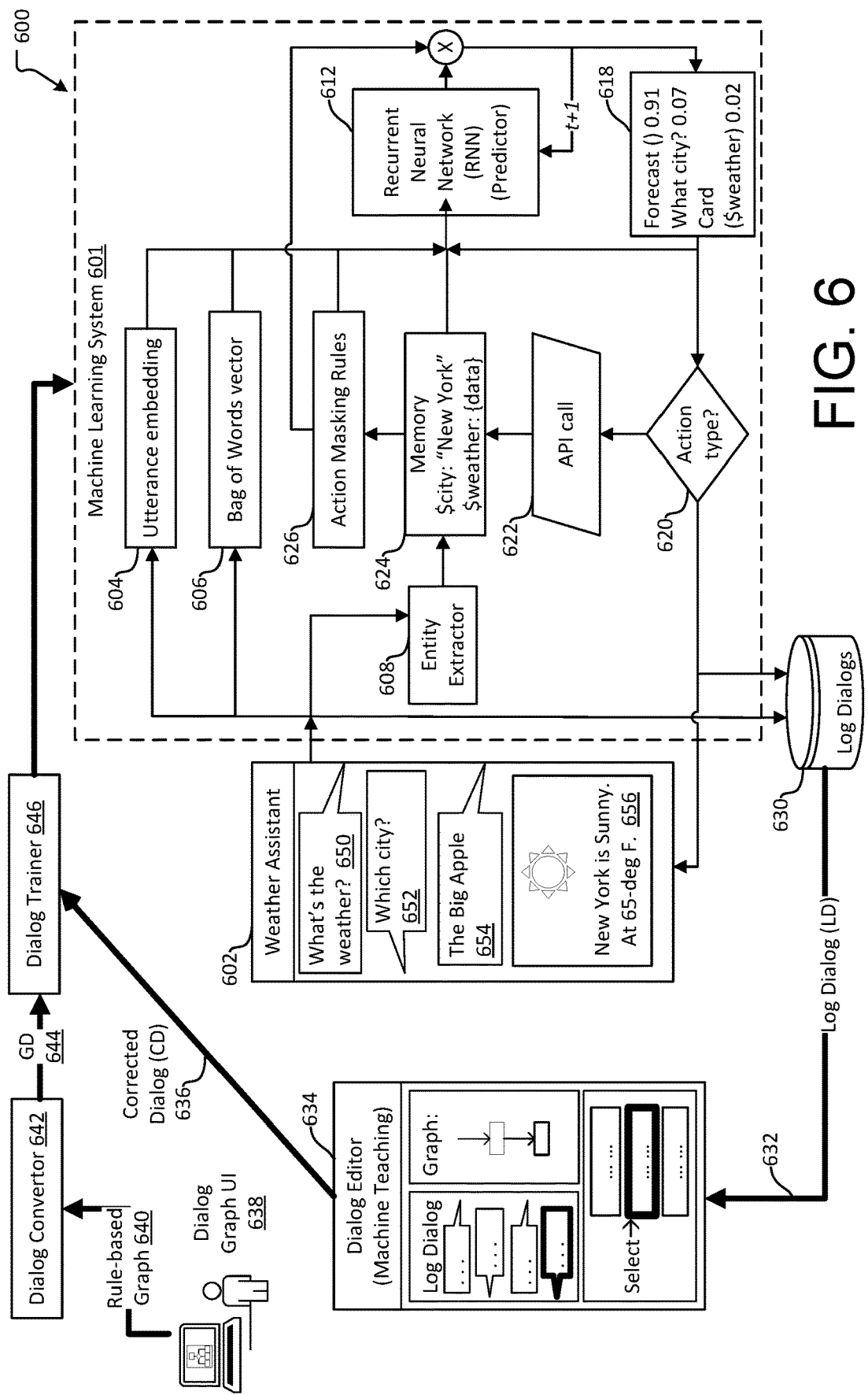

FIG. 6 illustrates an example of a conversation virtual assistant system according to an example system with which the disclosure may be practiced in accordance with aspects of the present disclosure.

Figure 7:
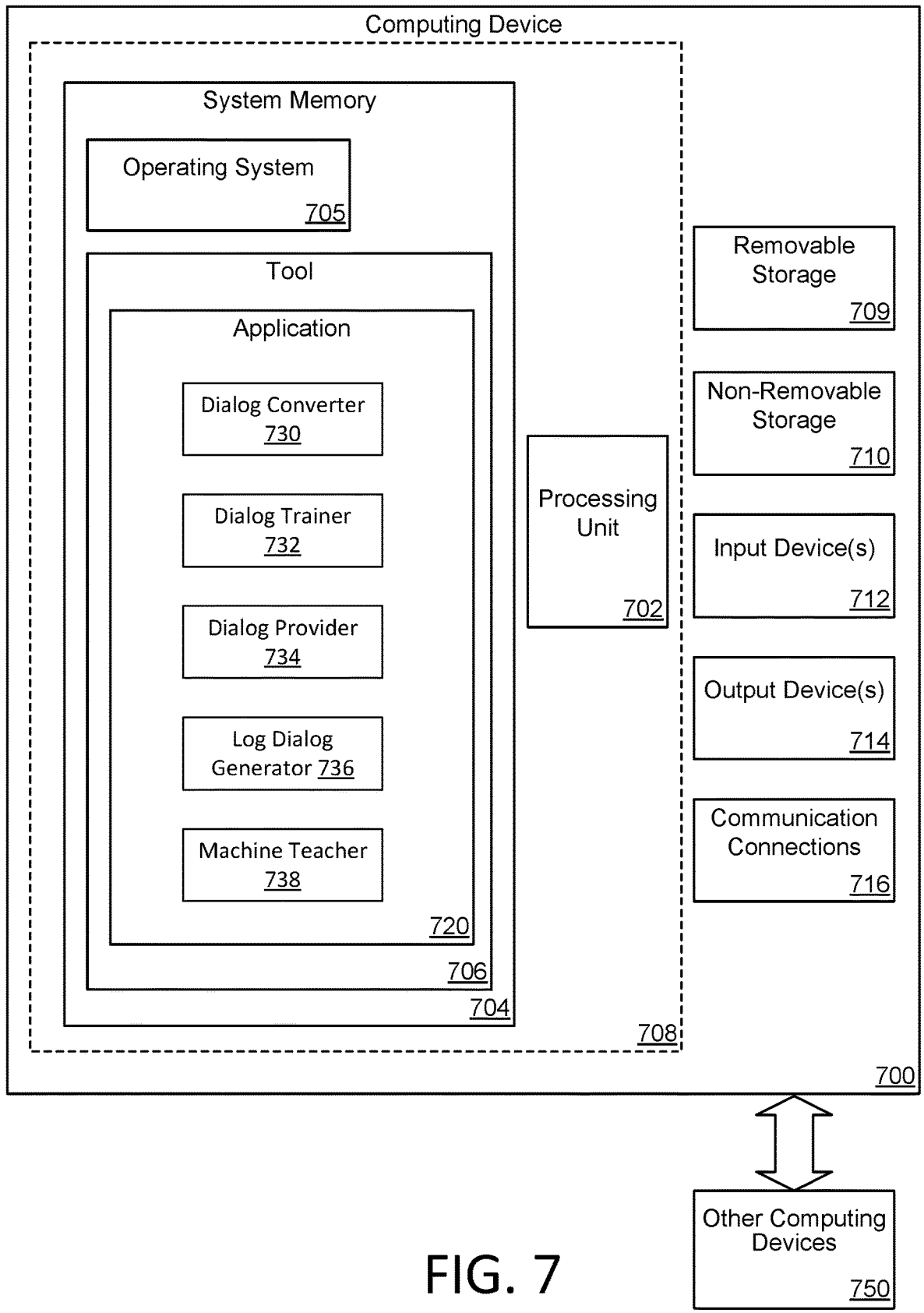

FIG. 7 is a block diagram illustrating example physical components of a computing device with which aspects of the disclosure may be practiced.

Figure 8A:
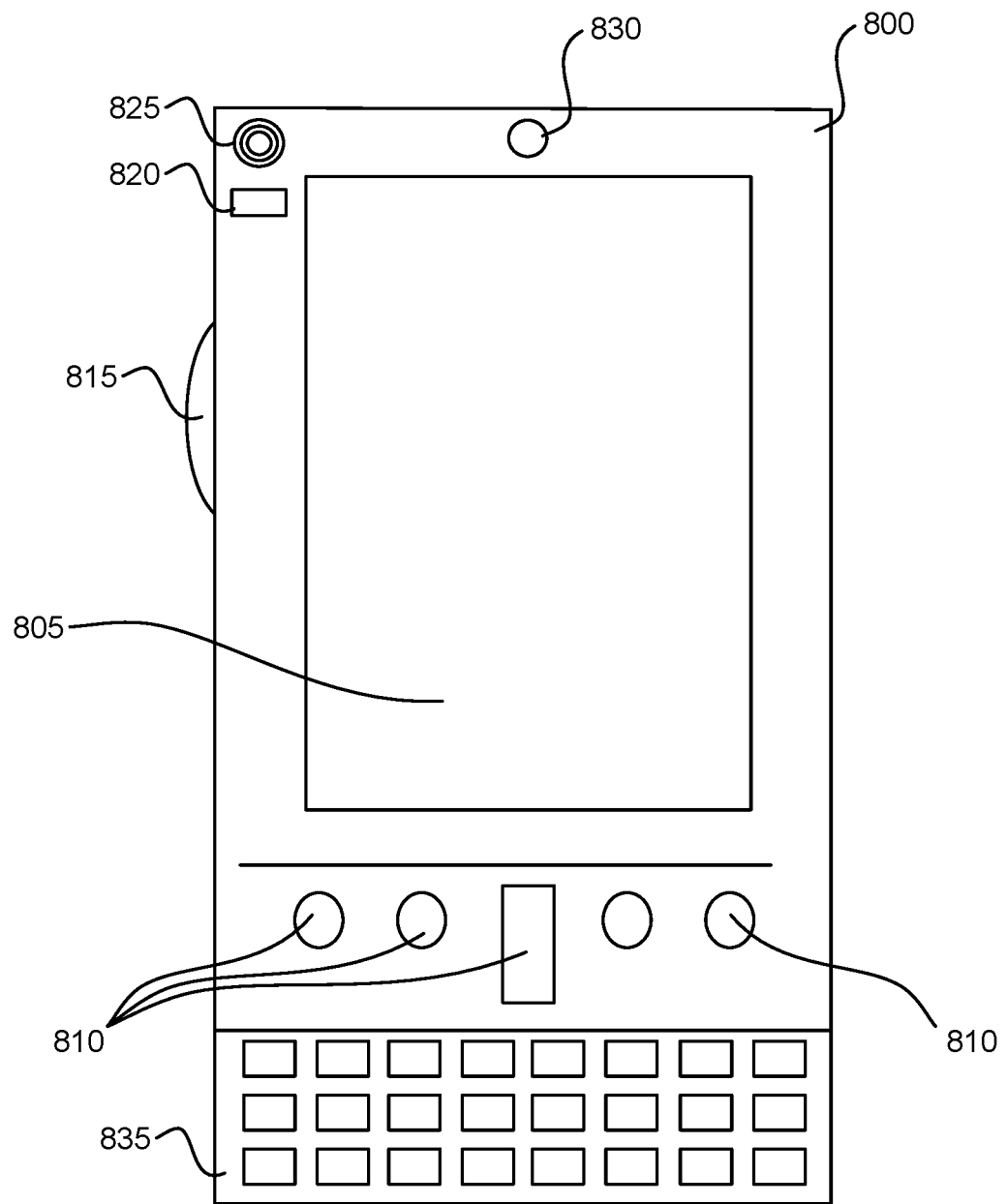

FIG. 8A is a simplified diagram of a mobile computing device with which aspects of the present disclosure may be practiced.

Figure 8B:
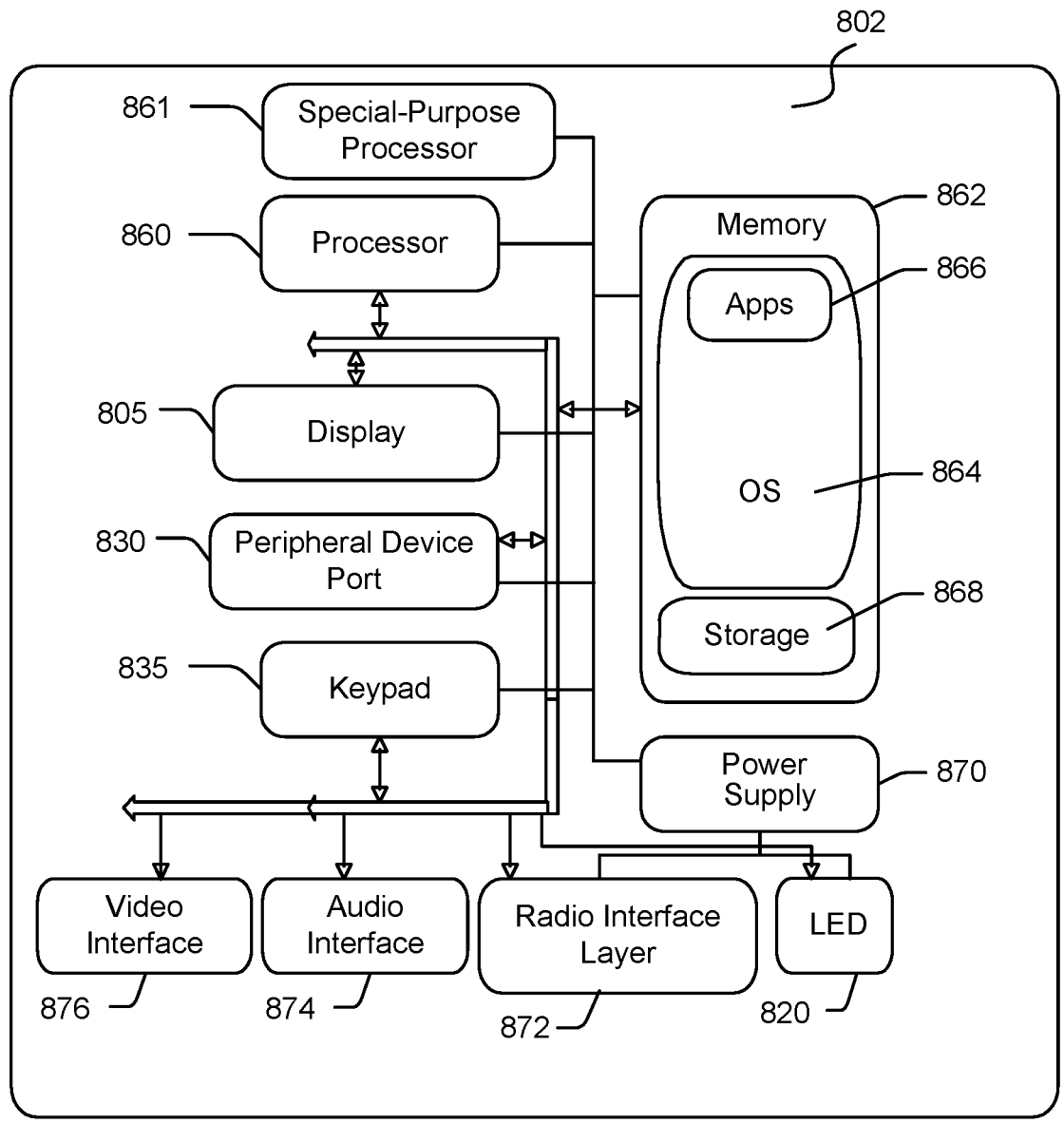

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for generating and improving user-system dialogs. As people are forced to navigate an increasingly digital world, use of task-oriented dialog systems, such as virtual assistant services, has become increasingly popular. Virtual assistant processing automates tasks by interfacing between users and the tasks they desire to accomplish—e.g., making reservations, scheduling appointments, accessing Frequently Asked Questions. For example, a user may access an application that receives user input and generates system response in the form of a dialog. User input may be in the form of a verbal utterance, a text input via a keyboard, a mouse or stylus input, an eye-gaze input, or any other type of user input. The user input may be a request or a response to a system query, a command, and notes for keeping, for example. The system response may be in the form of a system query, a system clarification, system alerts, or a system action. For example, the application may be a virtual assistant application whereby a user and a virtual assistant interactively exchange requests and responses via a dialog interface. In some aspects, the dialog interface may be a card including user interactive elements (e.g., buttons or other controls).

A task-oriented dialog system is typically built as a combination of three discrete systems, performing language understanding (for identifying user intent and extracting associated information), dialog management (for guiding users toward task completion), and language generation (for converting agent actions to natural-language system responses). Dialog management may be performed by a Dialog Manager (DM), which contains two sub-systems: a Dialog State Tracker (DST) for keeping track of the current dialog state, and a Dialog Policy (DP) for determining the next action to be taken in a given dialog instance. The DP relies on the internal state provided by the DST to select an action, which can be a response to the user, or some operation on the back-end database (DB). Collectively, a dialog manager including such sub-systems may implement "dialog management," and this application is directed to improvements in building dialog managers (DMs) to improve dialog management.

A machine-teaching system, as has become a popular approach in research, has advantages in that it learns directly from conversations, infers a representation of dialog states, and fixes bugs by making corrections through machine teaching. However, a traditional machine teaching system is ill-equipped to maintain a virtual assistant as the designer of the dialog makes changes to a flow of the dialog over time.

On the other hand, a typical industrial implementation of a task-oriented dialog system, the DM is expressed as a dialog flow (or dialog graph), which is often a finite state machine, with nodes representing dialog activities (system actions) and edges representing conditions (dialog states that represent the previous user-system interactions). Since a dialog flow can be viewed as a set of rules that specify the flow between dialog states, it may also be called a rule-based DM. There has been an increasing need for tools to help dialog authors develop and maintain rule-based DMs. These tools are often implemented as drag-and-drop WYSIWYG tools that allow users to specify and visualize all the details of the dialog flow. They often have deep integration with popular Integrated Development Environments (IDEs) as editing frontends. Examples of rule-based or partially rule-based DMs include Microsoft® Power Virtual Agents (PVA) and Bot Framework (BF) Composer. In some aspects, such tools have some built-in machine-learned, natural language understanding (NLU) capabilities, i.e., intent classification and entity detection. Such capabilities may be leveraged to trigger different rule-based dialog flows, e.g., by asking appropriate questions based on missing slots from the dialog state.

However, a rule-based DM suffers from two problems. First, these systems can have difficulty handling complex dialogs. Second, updating a rule-based DM to handle unexpected user responses and off-track conversations is often difficult due to the rigid structure of the dialog flow (or dialog graph), the long-tail (sparseness) of user-system dialogs, and the complexity in jumping to unrelated parts of the dialog flow (or dialog graph).

In this regard, development of the disclosed DM builder follows an iterative process of generation, testing, and revision, such as, but not limited to the following three-stage process:

1. Dialog authors develop a rule-based DM (dialog graph) using a dialog composer.
2. The DM is imported into a machine learning system, such as a hybrid code network (HCN) dialog system, for example. In some aspects, a HCN dialog system comprises an entity extractor, action mask filters with action masking rules, and a recurrent neural network (RNN), for example, as a machine learning system to train dialogs. Users (or human subjects recruited for system fine-tuning) interact with the HCN dialog system to generate user-system log dialogs.
3. Dialog authors may then revise the dialog system by selecting representative failed dialogs from the logs and teaching the system to complete these dialogs successfully. Regression testing may then be run and the process may returns to step 2.

As detailed herein, the application discloses a trained dialog builder—or "conversation learner"—that leverages machine teaching processing to improve development of DMs. In this way, the trained dialog builder combines the strengths of both rule-based and machine-learned approaches. The trained dialog builder allows dialog authors to (1) import a dialog graph developed using popular dialog composers, (2) convert the dialog graph to a machine learnable DM, such as an HCN-based DM, for example, (3)

continuously improve the HCN-based DM by reviewing user system log dialogs and providing updates via a machine teaching UI, and (4) generate a corrected dialog for retraining the machine learning.

Figure 1:
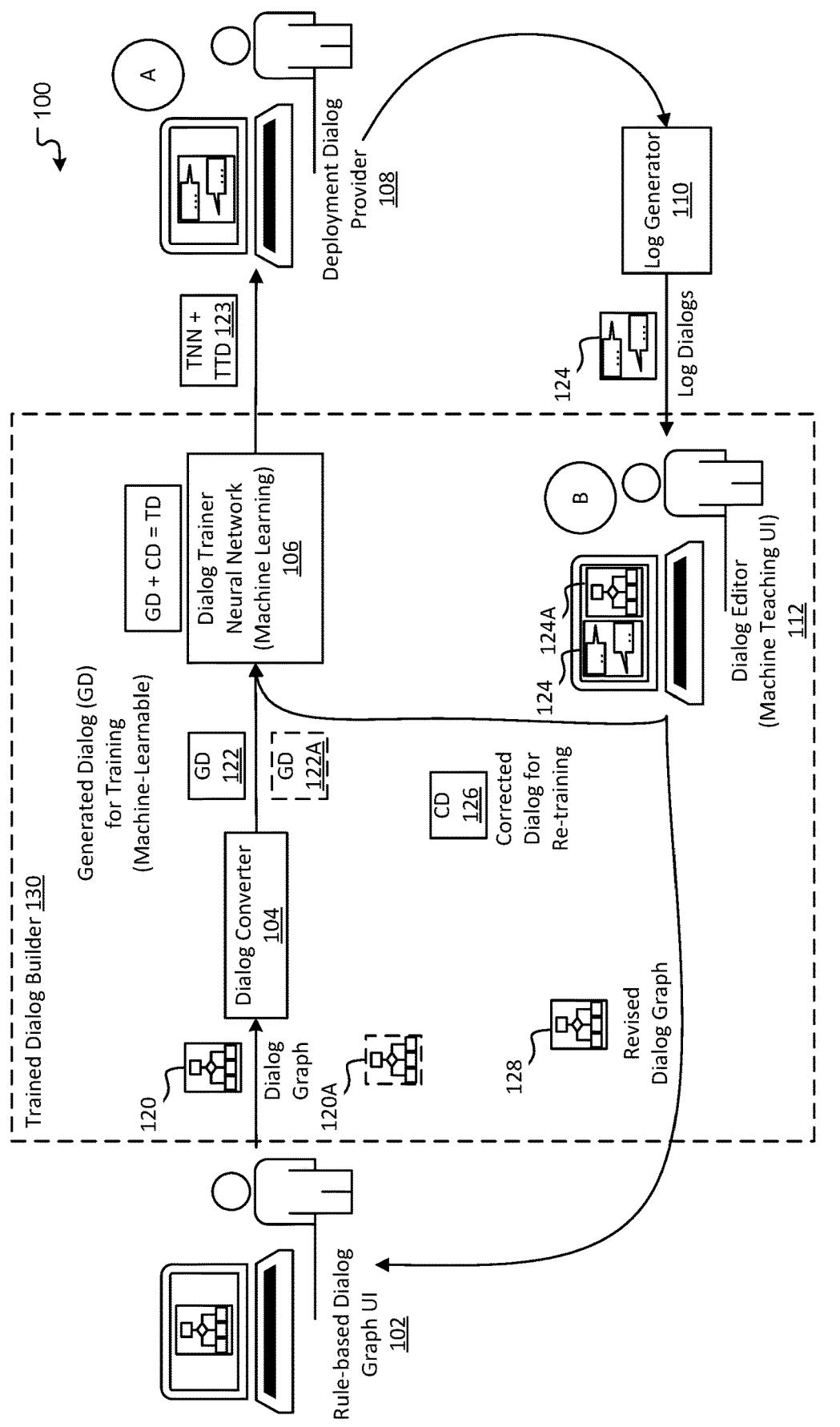
FIG. 1 illustrates an overview of an example system for improving user-system dialogs in accordance to aspects of the present disclosure.

FIG. 1 illustrates an overview of an example system for building dialog managers (DMs) in accordance with aspects of the present disclosure. System 100 may represent a system for generating and improving a user-system dialog using a trained dialog builder.

Rule-based dialog graph user interface (UI) 102 provides a user interface for generating a rule-based dialog graph. In some aspects, the rule-based dialog graph is designed (e.g., created and/or edited) by a developer using the rule-based dialog graph UI 102. Examples of rule-based or partially rule-based DMs include Microsoft® Power Virtual Agents (PVA) and Bot Framework (BF) Composer.

In some aspects, a dialog graph may comprise a plurality of nodes and at least one directional edge connecting two nodes of the plurality of nodes. Respective nodes represent actions taken by the system, e.g., a virtual assistant. Edges represent conditions for traversing the dialog graph from one node to another node. In some aspects, a first node may represent a virtual assistant action such as asking a question, "Which city?" An edge that connects the first node to a second node may represent a condition associated with an answer to the virtual assistant question such as, "The Big Apple." When a user input satisfies the condition for the edge, the edge is traversed to reach the second node, which may specify an action such as providing a message to the user, "You have specified New York as the city," for example.

As described herein, trained dialog builder 130 improves dialog management based on a combination of dialog converter 104, dialog trainer 106, and dialog editor 112. A developer (or author) may create a rule-based dialog graph 120 via a dialog graph user interface (UI) 102. The dialog converter 104 may then convert the dialog graph 120 into a set of generated dialogs or GDs 122. For instance, the dialog converter 104 may walk the dialog graph 120 to create a GD 122 for each path of the dialog graph 120. In aspects, the GDs 122 are a part of a set of training dialogs (TDs). As will be discussed further below, as the system continues to be trained, the dialog trainer 106 may also receive a set of corrected dialogs (CDs) 126, which are added to the GDs 122 as part of the set of TDs for retraining based on machine learning. In some aspects, the GDs 122 are provided in a data format that is machine learnable, such as a text format, such as Java Script Object Notation (JSON), for example. In contrast to the rule-based dialog graph 120, the GDs 122 comprise text phrases for machine learning. That is, GDs 122 may be easily processed for entity extractions and multi-vector expressions for use by a neural network of a machine learning system. In aspects, GDs 122 may be replaced by a new set of GDs when the developer generates a new rule-based dialog graph 120A via a dialog graph user interface (UI) 102, and the dialog converter 104 converts the newly generated rule-based dialog graph 120 into the new GDs 122A.

Dialog trainer 106 receives the GDs 122 for training (and the CDs 126 for retraining). In some aspects, dialog trainer 106 trains the set of training dialogs (TDs) (including the GDs 122 and any CDs 126) based on a hybrid-code network, which may be a recurrent neural network with action masking rules, for example. The dialog trainer 106 outputs the trained neural network (TNN) (including a set of trained training dialogs, TTDs) 123 for deployment to users to generate log dialogs 124 of user-system interactions. In aspects, the TNN and the set of TTDs 123 may be output to a deployment dialog provider 108 that manages deployment of the dialogs to users and compiles the log dialogs 124.

Deployment dialog provider 108 may deploy the TTDs 123 to users, for example, using a virtual assistant application. In some aspects, the deployment dialog provider 108 may use machine learning for classifying user input and determining a virtual assistant output as a response. Based on the user-system dialog (e.g., user inputs and virtual assistant outputs), log generator 110 captures the user inputs and the virtual assistant outputs and generates a log dialog 124. In aspects, each log dialog 124 may comprise at least one conversation thread of user-system interactions (e.g., user inputs and virtual assistant outputs).

One or more log dialogs 124 are provided to dialog editor 112, which provides an interactive tool for displaying and correcting (when necessary) the user-system dialogs as captured in the log dialogs 124. In this way, an exception in a log dialog 124, where the virtual assistant responded poorly or incorrectly to a user utterance, may be displayed to a developer. In some aspects, recommendations or suggestions for correcting the log dialog 124 may be provided. In other aspects, the developer may directly edit the log dialog 124. In this way, a "corrected dialog" (CD) 126 may be created. In aspects, CD 126 may be in a text-based format or may otherwise be adapted for machine-learning. In further aspects, CD 126 may be added to the set of generated dialogs (GDs) for further training using the machine learning system (e.g., dialog trainer 106). In some other aspects, the graph view may display CD entry points as "off-track nodes" as a UI convenience, without altering the dialog graph. CD and the dialog graph may be distinct sources of information that feed the machine learning: GDs which are generated from the dialog graph and CDs that are created from correcting log dialogs (LDs). In other aspects, the dialog graph may be edited to revolve issues by creating or editing nodes and edges, without creating a CD.

Additionally or alternatively, a log dialog 124 having an exception may be displayed along with a graph view 124A (e.g., a graphical illustration) of the log dialog 124 to enable a developer to revise, update, and correct a dialog flow for the log dialog 124. For instance, the developer may create or edit one or more edges or nodes within the graph view 124A of the log dialog 124 to address the exception. In some cases, the corrected graph view 124A may be incorporated into the dialog graph 120 to create a revised dialog graph 128. The revised dialog graph 128 may then be processed to create a revised set of dialogs for training, e.g., by dialog trainer 106. In this way, the dialog graph 120 may be updated by a developer (generating revised dialog graph 128), and a revised set of training data (i.e., a revised set of generated dialogs, GDs 122A) may also be generated for retraining the machine learning system. The disclosed system thereby addresses the maintainability issues of using machine teaching to improve a dialog flow.

In some aspects, the dialog editor 112 provides "machine teaching," where a "teacher" (e.g., a person or expert who is familiar with the task-oriented objective of the user-system dialog) provides one or more suggestions for addressing the exception so that a developer can edit the log dialog 124 to create a corrected dialog (CD) 126 that is more likely to result in the task-oriented objective. In aspects, the dialog editor 112 may forward the CD 126 to the dialog trainer 106. The dialog trainer 106 may then add the CD 126 to the generated dialogs or GDs 122 in the set of training dialogs (TDs) to retrain the neural network based on the CD 126 and the GDs 122. In some other aspects, dialog editor 112 may output revised dialog graph 128, which represents the corrected dialog graph 120A, to the rule-based dialog graph UI 102 for further manual edits of the revised dialog graph 128. The manually-edited revised dialog graph 128 (representing the dialog graph 120A) may be converted by the dialog converter 104 to convert the revised dialog graph 128 into a new set of revised GDs 122A, which are added to the previously generated GDs 122 and any CDs 126 in the set of TDs. The dialog trainer 106 may then retrain the neural network based on the newly generated GDs 122A included in the set of TDs.

In some aspects, the dialog converter 104 may convert a revised dialog graph 128, which is output from the rule-based dialog 102 (e.g., where the developer manually edits dialog graph 120) and/or the dialog editor 112 (e.g., where the developer revises a graph view of the log dialog), into a revised set of the generated dialogs (GDs) 122A such that the dialog trainer 106 may continue to retrain the neural network based on the revised set of GDs 122A within the set of TDs.

As should be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
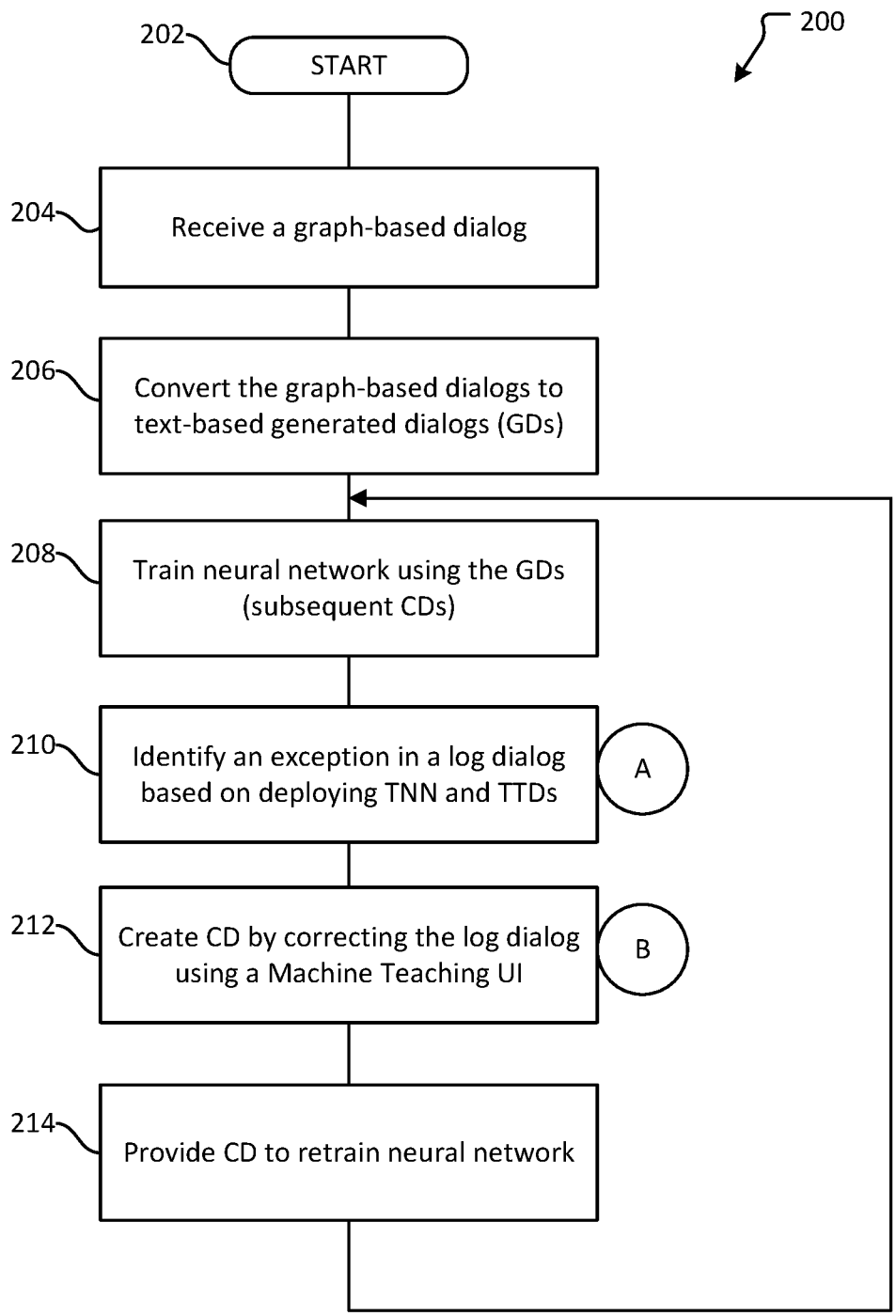
FIG. 2 illustrates an example method of generating dialog in an example system with which the disclosure may be practiced in accordance with aspects of the present disclosure.

FIG. 2 illustrates an example method of building and correcting dialog in accordance with aspects of the present disclosure.

A general order of the operations for the method 200 is shown in FIG. 2. Generally, the method 200 starts with a start operation 202 and may recur after provide operation 214. The method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4, 5A-E, 6, 7, and 8A-B.

At receive operation 204, a rule-based dialog (or dialog graph) may be received. The dialog graph depicts actions as nodes and conditions for the actions as edges in a graph format, where an edge connects one node to another. A node represents a system action (e.g., an action by a virtual assistant), which may be asking a question, providing a message, calling an API, constructing a sentence based on a template card with entity values, and the like. An edge is a condition such that a specific result of an action of a preceding node determines a next system action defined by a subsequent node. The condition may be "IF <value>", "WHEN", "OTHERWISE", for example. In aspects, there may be multiple edges originating from a node where different conditions result in different system actions defined by distinct nodes. As an example, when an originating node is a question, such as "Which state," a first edge connecting from the originating node may be "IF Washington." The first edge may connect to a second node that defines an action whereby the system confirms the user input by stating, e.g., "You have selected Washington as the state." A second edge connecting from the originating node may be a condition "IF Colorado." The second edge may connect to a third node that defines an action where the virtual assistant states, "You have selected Colorado as the state," for example. In other examples, an edge may connect to a node of a type "Question." Using an example above, for the condition "IF Colorado," rather than the third node, the second edge may connect to a fourth node defining an action of asking a question, "Are you sure about selecting Colorado as the state?" for example. In aspects, the rule-based dialog may be event-based dialog, where the event-based dialog uses a phrase instead of an entity as a trigger to execute rules. The phrase may be "help me" or "talk to someone," for example.

A convert operation 206, the dialog graph may be converted into generated dialogs (GDs) (e.g., by dialog converter 104). For example, at convert operation 206, the dialog graph may be walked such that each path in the dialog graph is converted to a GD. In aspects, a GD is in a data format that is machine learnable, such as a text format, for example. That is, a GD may be in a data format comprising textual words or phrases that can be processed to extract entities and multi-vector representations for use in machine learning. In some aspects, a GD comprises a collection of traversal patterns of the dialog graph, with directed edges from the origin(s) of the graph to the end(s) of the directed graph. In some aspects, the convert operation 206 converts each path of the dialog graph into a text-based dialog to generate more than one text-based dialogs. The text-based dialogs are machine learnable, and may optionally be expressed with tags as notations, using Java Script Object Notation (JSON) or an Extensible Markup Language (XML), for example.

At train operation 208, the set of training dialogs TDs (including GDs and any corrected dialogs, CDs) may be used for training a neural network for machine learning (e.g., by dialog trainer 106). In aspects, the set of GDs and CDs constitute at least a part of training dialogs (TDs). In some aspects, the machine learning may be accomplished using a hybrid code network (HCN). In further aspects, the HCN may comprise an entity extractor, action mask filters with action masking rules, and a recurrent neural network (RNN), for example. In some other aspects, train operation 208 may include training the neural network based on TDs (including any CDs and GDs) as samples for adjusting weight values for neurons in multiple layers of a multi-layer neural network that constitutes the HCN, for example.

At identify operation 210, one or more exceptions (e.g., errors or failures) are identified in a log dialog of user-system interactions generated based on deployment of a trained neural network and trained training dialogs (i.e., TTDs). In aspects, an exception may be a poor or incorrect statement made by the virtual assistant in response to a user input. An exception may include cases where the virtual assistant responded to a user input by saying, "Sorry, I do not understand," for example. Using the example above, if the virtual assistant asks the question, "which state," to which the user inputs, "Seattle," the virtual assistant may respond by saying, "Sorry, I do not understand." In some aspects, the identify operation 210 identifies the one or more exceptions by first deploying trained NN and TDs (TNN and TTDs 123) to users. In this case, a user and a virtual assistant may generate a conversation thread including user inputs and virtual assistant outputs. Based on the example above, a log dialog may be generated by capturing the conversation thread between the user and the virtual assistant and the log dialog may be flagged as including an exception (i.e., the virtual assistant response of, "Sorry, I do not understand").

Figure 3:
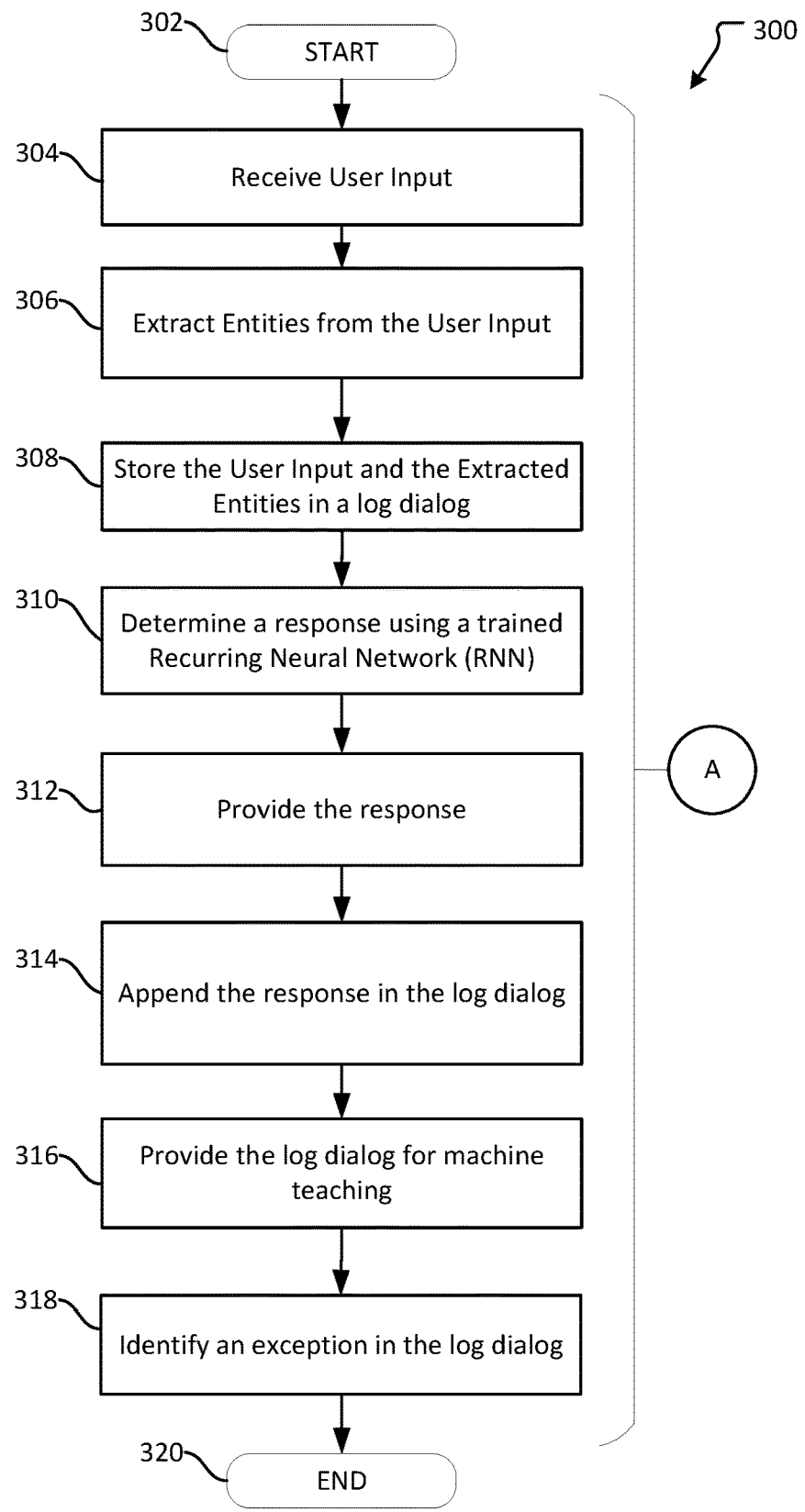
FIG. 3 illustrates an example method of generating a log dialog according to an example system with which the disclosure may be practiced in accordance with aspects of the present disclosure.

Details of deploying the TTDs 123 and generating a log dialog (A) are described in FIG. 3.

At create operation 212, a corrected dialog (CD) may be created by editing the log dialog using a machine teaching user interface (e.g., dialog editor 112). The machine teaching UI may provide an interactive operational environment, which displays at least a part of the log dialog (e.g., a conversation thread including at least one exception associated with a user-system interaction). The machine teaching UI may receive one or more corrections to the log dialog that address the one or more exceptions (B), which is described further in FIG. 4. The corrected dialog (CD) may be created by editing the log dialog and/or by editing a graph view of the log dialog. For instance, relying on an example above, for the exception in which the virtual assistant asked the question, "which state," and the user input was, "Seattle," the developer (or a user of the machine teaching UI) may create a new edge (e.g., condition, "IF Seattle") in the graph view (or graphical illustration) of the log dialog and connect it to a new node (e.g., stating, "You have selected Seattle, which is in the state of Washington") or to an existing node (e.g., handling city-based tasks, e.g., "The weather in Seattle is cloudy with a chance of rain"). In creating the new edge (and, in some cases, the new node), the dialog editor may create a corrected graph view of the log dialog.

At provide operation 214, the corrected dialog (CD) may be provided to a dialog trainer (e.g., the dialog trainer 106) for retraining the neural network on the CD (along with the previous created GDs) for machine learning. In some aspects, the dialog trainer 106 maintains sets of GDs, which are the base dialogs for training, and adds any the CDs, which are corrected dialogs for retraining the neural network for machine learning. For example, the CD may be added to a set of generated dialogs (e.g., GDs), which were used to previously train the neural network, in order to retrain the neural network at train operation 208, for example.

As should be appreciated, operations 202-214 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 3 illustrates an example method of generating a log dialog for machine teaching based on deploying trained training dialogs (TTDs) in accordance with aspects of the present disclosure.

A general order of the operations for the method 300 is shown in FIG. 3. Generally, the method 300 starts with a start operation 302 and ends with an end operation 320. The method 300 may include more or fewer steps or may arrange ordering of the steps differently than those shown in FIG. 3. The method 300 is directed to deploying TTDs (e.g., deploying a trained neural network from a machine learning system) to a service whereby users converse with a virtual assistant based on the trained neural network. The method 300 can be executed as a set of computer-executable instructions executed by a computer system and encoded or stored on a computer readable medium. Further, the method 300 can be performed by gates or circuits associated with a processor, an ASIC, an FPGA, a SOC, or other hardware device. Hereinafter, the method 300 shall be explained with reference to the systems, component, devices, modules, software, data structures, data characteristic representations, signaling diagrams, methods, etc., described in conjunction with FIGS. 1, 2, 4, 5A-E, 6, 7, and 8A-B.

At receive operation 304, a user input may be received. The user input may be in the form of an utterance (e.g., verbal or keyed), a selection (e.g., by click or touch input), or any other input (e.g., eye-gaze input, heartrate, motion, emotional affect, etc.). In some aspects, the user input may be a trigger for a virtual assistant to start a conversation. For example, where the user input is, "weather?" the virtual assistant may respond with (output) a weather forecast for a particular location.

At extract operation 306, one or more entities may be extracted from the user input. Extracted entities may be one or more words from the received user input, for example. In some aspects, the entity extraction from the user input is based on dictionaries of words in one or more predetermined subject domains. For instance, using the example above, the user input, "weather?" includes a single word that, when extracted, may associate the user input with a weather domain.

At store operation 308, the user input may be stored within a conversation thread in a log dialog. Additionally, extracted entities from the user input may be stored in the log dialog. For instance, the extracted entities may be annotated for training the machine learning to accurately provide virtual assistant responses.

At determine operation 310, a response is determined. In aspects, concatenated vectors are generated based on utterance embedding from the user input after context features of the entities have been extracted from the user input. The concatenated vectors are then used as input to the recurrent neural network to generate a multi-dimensional vector that represents a probability distribution of actions to be taken. A number of dimensions of the multi-dimensional vector may be equal to a number of distinct system action templates. The magnitude of each dimension may represent a probability where a corresponding action is to be performed in response to the user input. The neural network may be a part of a hybrid code network (HCN) that comprises a recurrent neural network, a set of task-specific action templates, and a set of action masks. Using the example above, a task-specific action template (e.g., "the weather of [city/state]?") may be determined for the user input, "weather?" Each action mask represents an "if-then" rule that determines a set of valid actions under some conditions (e.g., particular dialog states or user inputs). For example, the rules that determine transitions within a dialog flow can be represented as action masks in the machine learning environment. The action templates and action masks being used in conjunction with the recurrent neural network enable efficient generation of a probability distribution of action templates in response to the user input to determine a subsequent system response (output) to the user input by defining a scope of the subject domain. Continuing with the example above, for the selected action template (e.g., "the weather of [city/state]?"), it may be determined that more information is needed from the user in order to complete the task (i.e., to provide the weather for an appropriate location). In this case, an action mask may be used to determine a valid action. For instance, the virtual assistant may respond by asking, "For which city or state would you like the weather?" In some aspects, the determined response by the virtual assistant may be input to the recurrent neural network for further training.

At provide operation 312, the determined response may be provided to the user. The determined response may be provided to the user by any suitable means, e.g., causing the determined response to be provided as a visual output on a display or as an audio output. In some aspects, the determined response may be provided by a virtual assistant via a dialog interface.

At append operation 314, the determined response may be appended to the conversation thread in log dialog. This way, the log dialog includes both the user input and the virtual assistant response (output) to enable review of the conversation thread and identification of exceptions, e.g., a poor response made by the virtual assistant.

At provide operation 316, the log dialog may be provided to dialog editor for machine teaching. As described in details below, the dialog editor (e.g., dialog editor 112) provides a machine teaching user interface to enable displaying the log dialog, one or more exceptions that have been identified, a flow view (or graphical illustration) of the dialog, and interactively correcting the log dialog to rectify the one or more exceptions.

At identify operation 318, an exception in the log dialog may be identified. In aspects, exceptions include poor or inaccurate system outputs to a user input, for example.

As should be appreciated, operations 302-320 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 4:
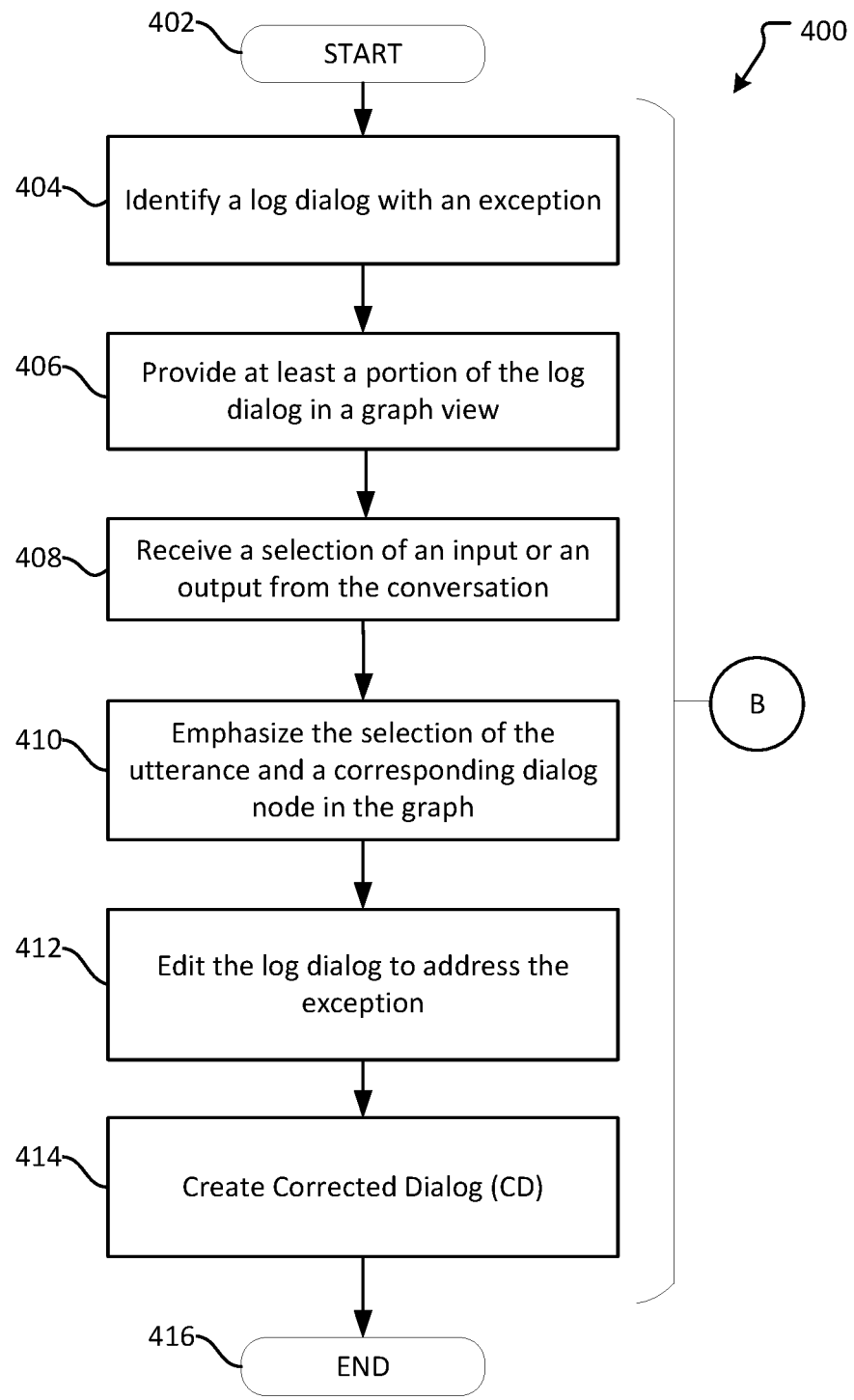
FIG. 4 illustrates an example method of generating corrected dialogs according to an example system with which the disclosure may be practiced in accordance with aspects of the present disclosure.

FIG. 4 illustrates an example method of generating a corrected dialog (CD) in accordance with aspects of the present disclosure.

A general order for the operations of the method 400 is shown in FIG. 4. Generally, the method 400 starts with a start operation 402 and ends with an end operation 416. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, component, devices, modules, software, data structures, data characteristic representations, signaling diagrams, methods, etc. described in conjunction with FIGS. 1, 2, 3, 5A-E, 6, 7, and 8A-B. The method 400 may be provided as a part of a machine teaching user interface (dialog editor 112), which is a user interface enabling a user to analyze an exception that occurred during a user-system dialog by reviewing a log dialog and editing the log dialog to create a corrected dialog.

At identify operation 404, a log dialog with an exception that occurred during a conversation between a user and the virtual assistant may be identified. The conversation may be provided by a machine teaching UI via a display, via a speaker, or otherwise. In some aspects, the log dialog includes a sequential set of utterances, including user inputs and virtual assistant outputs, as a conversation in a text-based format. In some aspects, an exception within a log dialog may be identified by the machine learning system or another automated system; in other aspects, an exception within a log dialog may be identified by user inspection. In some aspects, some words of the user inputs and/or the virtual assistant outputs may be tagged as entities for correcting the log dialog. In aspects, the utterances may be selectable for providing detailed information about entities, alternative response outputs based on the entities, suggested conditions based on the exception, and the like, for correcting the log dialog.

At provide operation 406, at least a portion of the log dialog may be provided in a graph view. For instance, the graph view may represent the log dialog in terms of one or more nodes (e.g., corresponding to system actions) and one or more edges (corresponding to conditions based on user inputs and connecting the nodes). In aspects, the nodes and edges may be selectable for editing the graph view. Editing the graph view may include, among other examples, creating new edges and/or new nodes, creating new edges between existing nodes, modifying existing edges and/or nodes, deleting existing edges and/or nodes, and the like.

At receive operation 408, a selection of an utterance (e.g., a user input or a virtual assistant output) from the conversation of the log dialog may be received. In some aspects, the selected utterance may be emphasized (e.g., via highlighting, bolded text, outlining, etc.) to distinguish the selected utterance from other utterances in the conversation. In some cases, the selected utterance may be associated with an exception. Exceptions may include poor or inaccurate system outputs to a user input. Text phrases of exceptions may include "Sorry, I don't understand," or a virtual assistant output that is not responsive to the user input, for example.

At emphasize operation 410, the selected utterance (e.g., the poor response made by the virtual assistant) may be emphasized for correcting the log dialog. Additionally or alternatively a node and/or an edge corresponding to the selected utterance may be emphasized in the graphical illustrations. For instance, the node and/or the edge may be highlighted, bolded, outlined, etc., to convey that the node and/or the edge corresponds with the selected utterance. In some aspects, an edge may be highlighted within the graph view because the edge describes a condition associated with a selected user input. Additionally or alternatively, a node may be highlighted within the graph view because the node describes a system action associated with a selected virtual assistant output, e.g., providing a response message, asking a question, or calling an application programming interface (API), for example.

At edit operation 412, an edit may be received to the selected utterance of the log dialog and/or to the node or edge corresponding to the selected utterance in the graph view to address the exception found on the log dialog. The edit to the selected utterance of the log dialog (or to a corresponding edge or node of the graph view) may mitigate the exception. In some aspects, an edit to the log dialog may be received based on the edits made to the graph view through the machine teaching UI. For instance, a developer may edit text of the selected utterance of the log dialog to create a corrected dialog (CD) that addresses the exception. Additionally or alternatively, the developer may edit the graph view of the log dialog to address the exception by creating new edges and/or new nodes, creating new edges between existing nodes, modifying existing edges and/or nodes, deleting existing edges and/or nodes, and the like.

In some aspects, system actions represented by virtual assistant output in the edited log dialog may be marked as "entry node" or "reprompt" actions. For instance, marks may be received to specific utterances and, additionally or alternatively, to nodes representing system actions. An "entry node" action is an action with a higher probability to be selected as the first action of a conversation (i.e., conversation starter). If an action is marked as a "reprompt" action, the action will have a higher probability to be repeated by the system if the user utterance doesn't match one of the expected answers for that action. This way, a dialog trainer (i.e., a conversation learner (CL)) may incorporate these specific types of actions into retraining the neural network to predict accordingly. CL leverages a training dialog (TD) (where the TD includes GDs) augmentation mechanism using a corrected dialog (CD) based on the edited log dialog. In some aspects, in preparing for retraining (i.e., featurizing) the neural network, the training dialogs may be augmented with synthetic train dialogs that simulate "entry node" and "reprompt" behavior by injecting out-of-domain user utterances and also by modifying masked actions based on a CD with marked actions. In aspects, when a dialog trainer (e.g., dialog trainer 106) implementing continuous learning observes a reprompt action in a training dialog, the dialog trainer adds an augmented copy of the training dialog by injecting an out-of-domain round that comprises an out-of-domain utterance and the reprompt action. Based on the simulated behavior in the dialog, the neural network learns and makes the expected predictions. In some other aspects, the action masks (e.g., action masking rules 626) may be augmented based on the marked actions to constrain the CL predictions and provides the expected predictions to address the specific scenarios where a new conversation starts and where actions repeat.

At create operation 414, the corrected dialog (CD) may be created based on the edits to the log dialog at edit operation 412. In some aspects, generating the CD includes generating text-based data suitable for retraining a neural network using machine learning, e.g., retraining an HCN. In other aspects, e.g., when the developer edits the log dialog directly, the CD may already be in a text-based format. The text-based format may be based on a notation or markup language, such as JSON or XML, for example. The generated CDs may then be used to retrain the neural network for machine learning. In some aspects, to reduce processing load on the neural network, the generated CDs may be added to the set of TDs to retrain a neural network that was previously trained based on the set of TDs. In other aspects, a revised set of TDs may be generated from a revised dialog graph (e.g., revised dialog graph 128) and the revised set of TDs may be used to retrain the neural network.

As should be appreciated, operations 402-416 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIGS. 5A-E illustrate examples of an interface for revising a log dialog (LD) to create a corrected dialog (CD) through machine teaching according to an example system in accordance with aspects of the present disclosure.

Figure 5A:
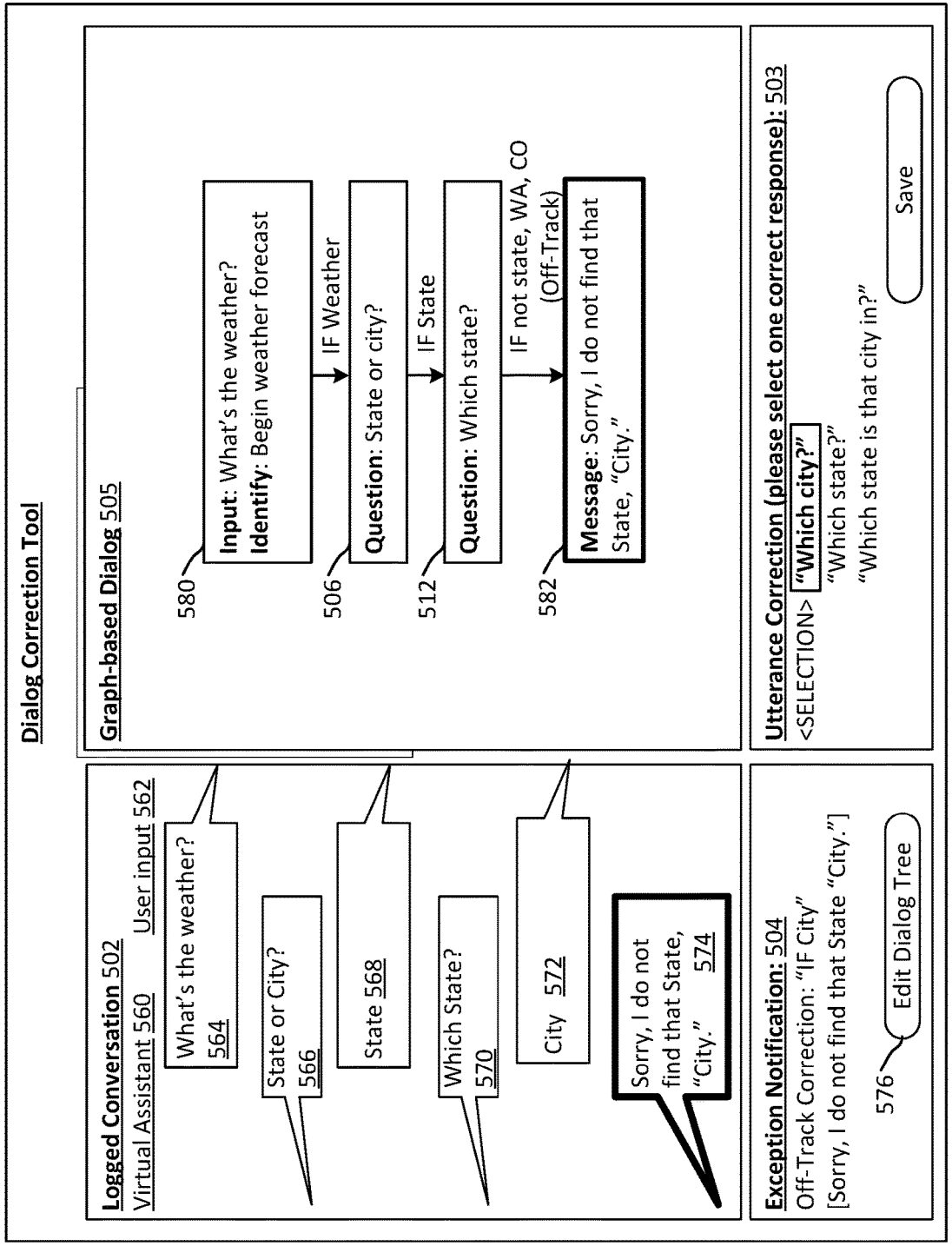

FIG. 5A illustrates an example user interface of a machine teaching UI (e.g., dialog editor 112). The example user interface 500A depicts an example graphical user interface in a window entitled, "Dialog Correction Tool." In aspects described above, the Dialog Correction Tool may correspond to dialog editor 112 (e.g., a machine teaching UI). The window comprises four sub-windows, for example: a logged conversation sub-window 502, an utterance correction sub-window 503, an exception notification sub-window 504, and a graph view sub-window 505. In other examples, more or fewer sub-windows may be provided. In still other examples, rather than displaying sub-windows within a single window or interface, the functionality described below may be provided in different tabbed windows or interfaces, may be displayed in overlay or popup windows or interfaces, may be provided as card interfaces with interactive controls, or may be otherwise provided. As illustrated in this example, the graph view displayed in sub-window 505 corresponds to the logged conversation (e.g., log dialog) of user inputs and virtual assistant outputs displayed in sub-window 502.

The logged conversation sub-window 502 may provide a complete or partial set of utterances associated with the logged conversation (e.g., log dialog). As illustrated, the logged conversation includes a sequential set of user inputs 562 and virtual assistant outputs 560. User input 564 queries, "What's the weather?" and virtual assistant output 566 clarifies, "State or city?" User input 568 then indicates, "State." The virtual assistant output 570 queries the user by asking a question, "Which state?" and user input 572 responds, "City." Virtual assistant output 574 then states, "Sorry, I do not understand that state, 'city.'" The last virtual assistant output 574 is highlighted because the virtual assistant output 574 is determined to be an exception in that it did not accurately respond to user input 572.

Utterance correction sub-window 503 provides a list of candidate utterances for selection to correct the output 574 with exception (e.g., the poor response made by the virtual assistant during the dialog, an off-track correction) as emphasized in the logged conversation sub-window 502. Exception notification sub-window 504 provides details regarding the failed output 574.

Sub-window 505 displays the graph view associated with the logged conversation (e.g., log dialog) provided in sub-window 502. In aspects, the sub-window 505 enables interactively correct utterance in the log dialog by editing the graph view of the logged conversation. In the example, the graph view includes an initial node 580 that begins a weather forecast operation based on a user input "What's the weather?" 564. A node 506 defines a first action, "Question: State or City?" and "Identify multiple choice options: State and City." In some aspects, Sub-window 505 displays the graph view that includes the sequence of utterances displayed in Sub-window 502 (e.g., the nodes (580, 506, 512, and 582) and the edges in the sub-window 502). The node 582 with a message "Sorry, I do not find that State, 'City,'" is highlighted to convey that the node 582 corresponds to the virtual assistant output 574. The edge that connects to the node 582 indicates "IF not state, WA, CO (Off-Track)" to convey that the edge leading to the node 582 is an off-track response for correction based on the learned dialog system as deployed for use to create the log dialog. Accordingly, the sub-window 504 may indicate an exception notification that describes the off-track correction with respect to "IF City." Selecting an interactive button 576, "Edit Dialog Tree," enables interactively editing the dialog tree as displayed in the graph view in the sub-window 505.

Figure 5B:
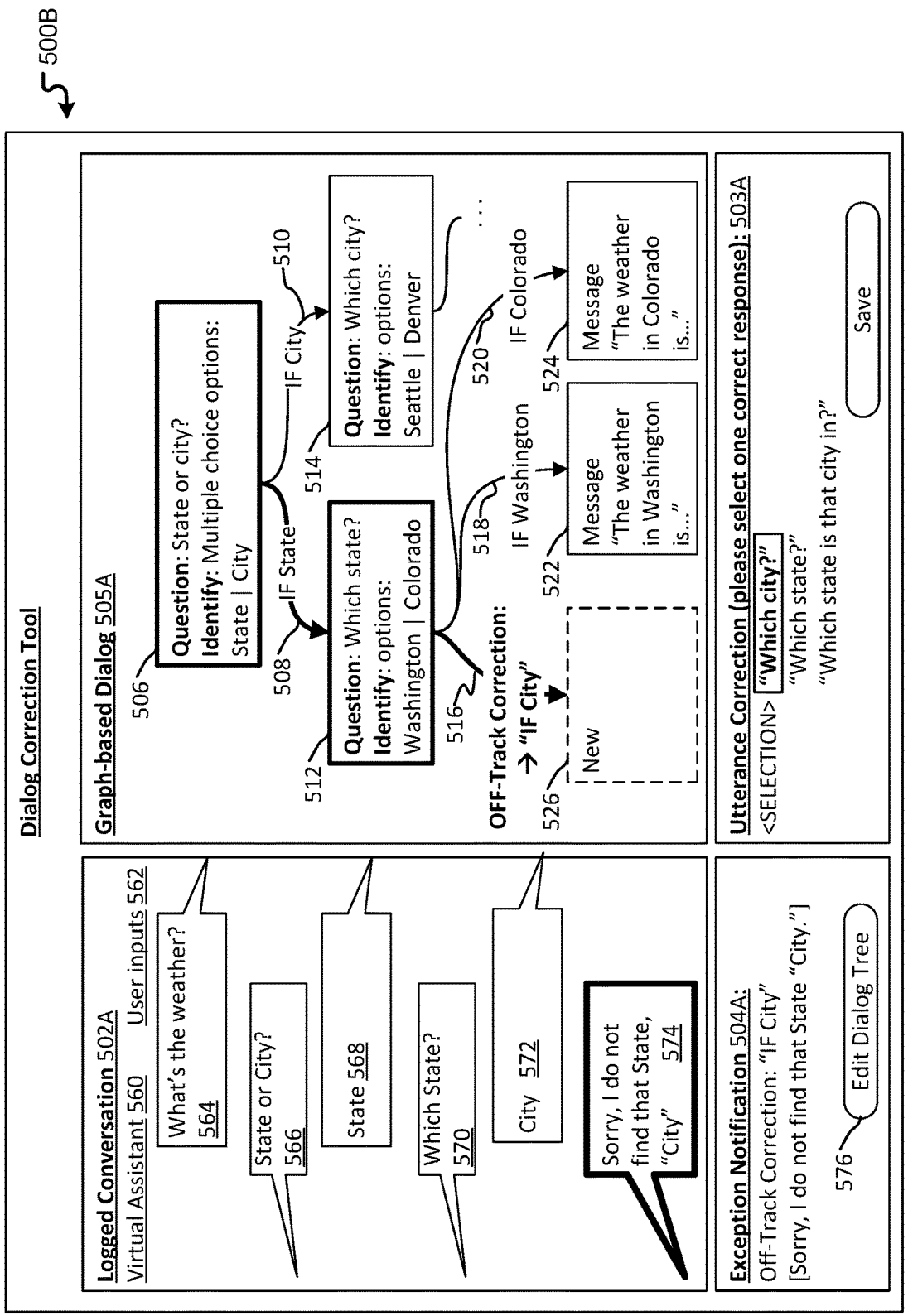

FIG. 5B illustrates an example user interface of a machine teaching UI (e.g., dialog editor 112). The example user interface 500B depicts an example graphical user interface in a window entitled, "Dialog Correction Tool." In aspects described above, the Dialog Correction Tool may correspond to dialog editor 112 (e.g., a machine teaching UI). The window comprises four sub-windows, for example: a logged conversation sub-window 502A, an utterance correction sub-window 503A, an exception notification sub-window 504A, and a graph view sub-window 505A. In other examples, more or fewer sub-windows may be provided. In still other examples, rather than displaying sub-windows within a single window or interface, the functionality described below may be provided in different tabbed windows or interfaces, may be displayed in overlay or popup windows or interfaces, may be provided as card interfaces with interactive controls, or may be otherwise provided. As illustrated in this example, the graph view displayed in sub-window 505A corresponds to the logged conversation (e.g., log dialog) of user inputs and virtual assistant outputs displayed in sub-window 502A.

The logged conversation sub-window 502A may provide a complete or partial set of utterances associated with the logged conversation (e.g., log dialog). As illustrated, the logged conversation includes a sequential set of user inputs 562 and virtual assistant outputs 560. User input 564 queries, "What's the weather?" and virtual assistant output 566 clarifies, "State or city?" User input 568 then indicates, "State." The virtual assistant output 570 queries the user by asking a question, "Which state?" and user input 572 responds, "City." Virtual assistant output 574 then states, "Sorry, I do not understand that state, 'city.'" The last virtual assistant output 574 is highlighted because the virtual assistant output 574 is determined to be an exception in that it did not accurately respond to user input 572.

Utterance correction sub-window 503A provides a list of candidate utterances for selection to correct the output 574 with exception (e.g., the poor response made by the virtual assistant during the dialog, an off-track correction) as emphasized in the logged conversation sub-window 502A. The sub-window 503A displays an instruction, "Please select one correct response," for example. As illustrated, sub-window 503A displays for selection candidate utterances: "Which city?", "Which state?" and "Which state is that city in?" The utterance, "Which city?" is shown as selected by a user, for example, by shading. In aspects, after selection, the corrected utterance may be saved by selecting a "Save" button or similar confirmation. Once the selection is made, the log dialog may be modified by replacing the output 574, "Sorry I do not find that State, 'City'" (e.g., the poor response as a virtual assistant output) with the corrected virtual assistant output 574C, "Which city?" as shown in FIG. 5D. This way, the utterance correction sub-window 503A enables interactively correct utterance in the logged conversation sub-window 502A between the virtual assistant outputs 560 and the user inputs 562 as stored in in the log dialog (e.g., the log dialog 124 and the log dialogs 630).

Exception notification sub-window 504A provides details regarding the failed output 574. For instance, sub-window 504A provides an off-track condition ("IF City") that was not addressed by the logged conversation (or log dialog), that is, the exception occurred when the virtual assistant could not process user input 572 "City" in response to virtual assistant output 570 requesting, "Which State?" Sub window 504A also displays the inaccurate output 574: "Sorry, I do not find that State, 'City.'" In aspects, selection of an interactive button 576, "Edit Dialog Tree," enables editing of the graph view shown in the graph view sub-window 505A.

Sub-window 505A displays the graph view associated with the logged conversation (e.g., log dialog) provided in sub-window 502A. In aspects, the sub-window 505A enables interactively correct utterance in the log dialog by editing the graph view of the logged conversation. In the example, the graph view includes a first node 506 defining a first action, "Question: State or City?" and "Identify multiple choice options: State and City." In some aspects, Sub-window 505A displays the graph view that includes the sequence of utterances displayed in Sub-window 502A (e.g., the nodes (506 and 512) and the edges (508 and 516) as highlighted in the sub-window 502A). In some other aspects, the graph view may also display nodes and edges that relate to utterances not currently displayed in the sub-window 502A (e.g., those nodes and edges that are in proximity, nodes within one edge for example, of the dialog path in the displayed utterance) but are in the logged conversation data. In the example, the question "State or city?" posed by the virtual assistant in the first node 506 is a graph view representation of the virtual assistant output 566 "State or city?" as shown in the logged conversation sub-window 502A. The first node 506 is connected by a first edge 508 ("IF State") to a second node 512 and is connected by a second edge 510 ("IF City") to a third node 514. The second node 512 defines a second action, "Question: Which state?" and "Identify options: Washington and Colorado." The second action as defined by the second node 512 corresponds to a virtual assistant output 570 "Which state" in the logged conversation sub-window 502A. The third node 514 defines a third action, "Question: Which city?" and "Identify options: Seattle and Denver."

The second node 512 is connected by a third edge 518 ("IF Washington") to a fourth node 522 and is connected by a fourth edge 520 ("IF Colorado") to a fifth node 524. The fourth node 522 describes a fourth action when the condition, "IF Washington," specified by the third edge 518 is satisfied of: "Message: The weather in Washington is . . . ." The fifth node 524 describes a fifth action when the condition, "IF Colorado," specified by the fourth edge 520 is satisfied of: "Message: The weather in Colorado is . . . ."

Sub-window 505A also displays a new edge 516 ("Off-Track Correction:→"IF City"). The new edge 516 specifies a condition that relates to the exception in the logged conversation. In this example, the exception is associated with the inaccurate virtual assistant output 574 ("Sorry, I do not find that State, 'City'") in response to the user input 572 ("City"). Additionally or alternatively, the sub-window 505A displays a new node 526 connected to new edge 516. New node 526 is outlined with dashes, conveying that new node 526 is available for defining a new action to address the exception in the logged conversation.

In some aspects, the machine teaching UI may provide for interactively updating the logged conversation (e.g., log dialog) to address an exception and/or updating a graph view of the logged conversation to address the exception. For instance, the log dialog and/or the graph view may be updated to: (1) correct entity detection and define error handling; (2) correct state-to-action mapping by creating or modifying one or more edges in the graph view; and/or 3) create a new action template by creating a new node in the graph view. In some aspects, the machine teaching UI may create a corrected dialog (CD) based on the edited log dialog. The corrected dialog (CD) may be provided for retraining by a machine learning system.

Figure 5C:
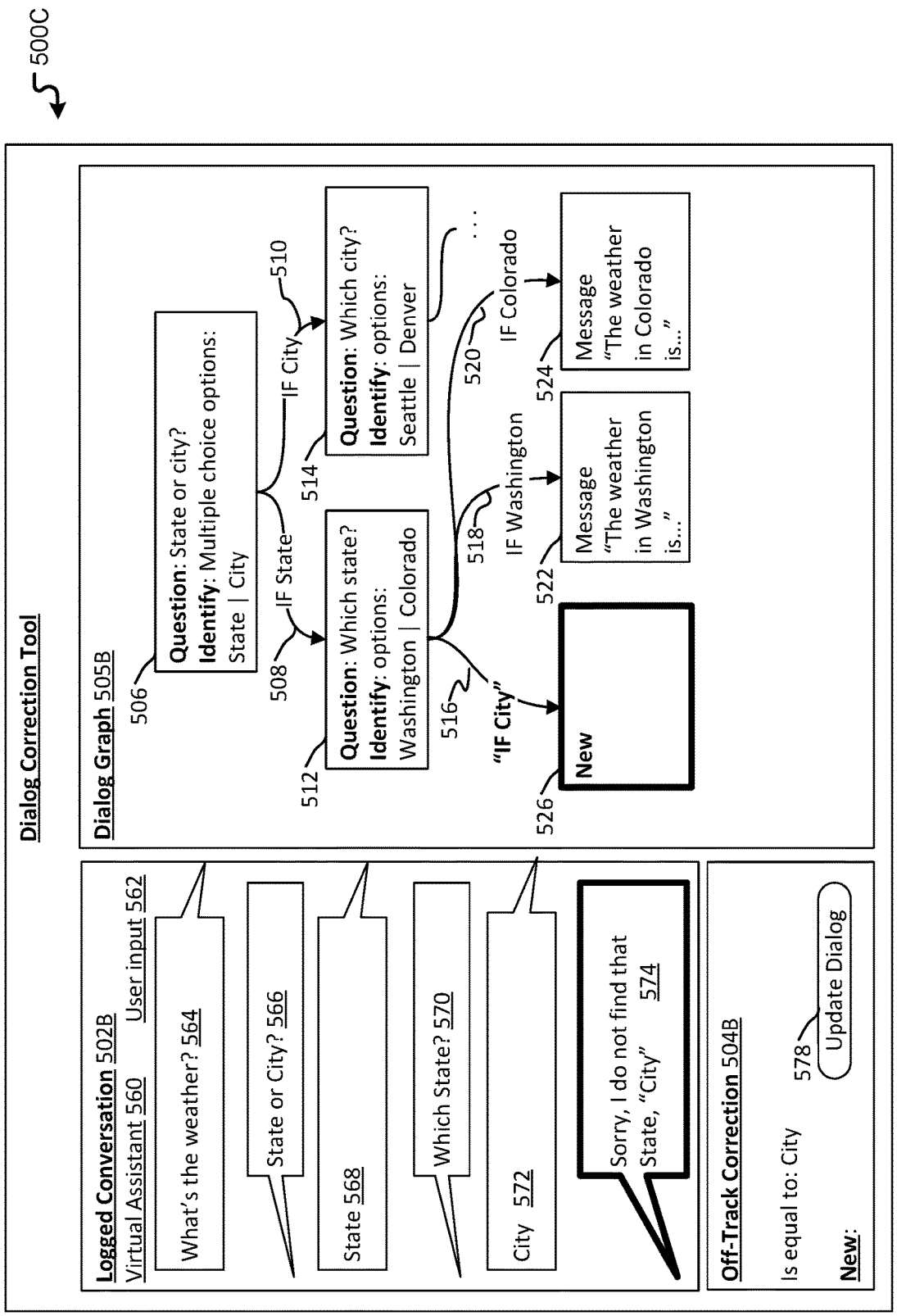
Figure 5D:
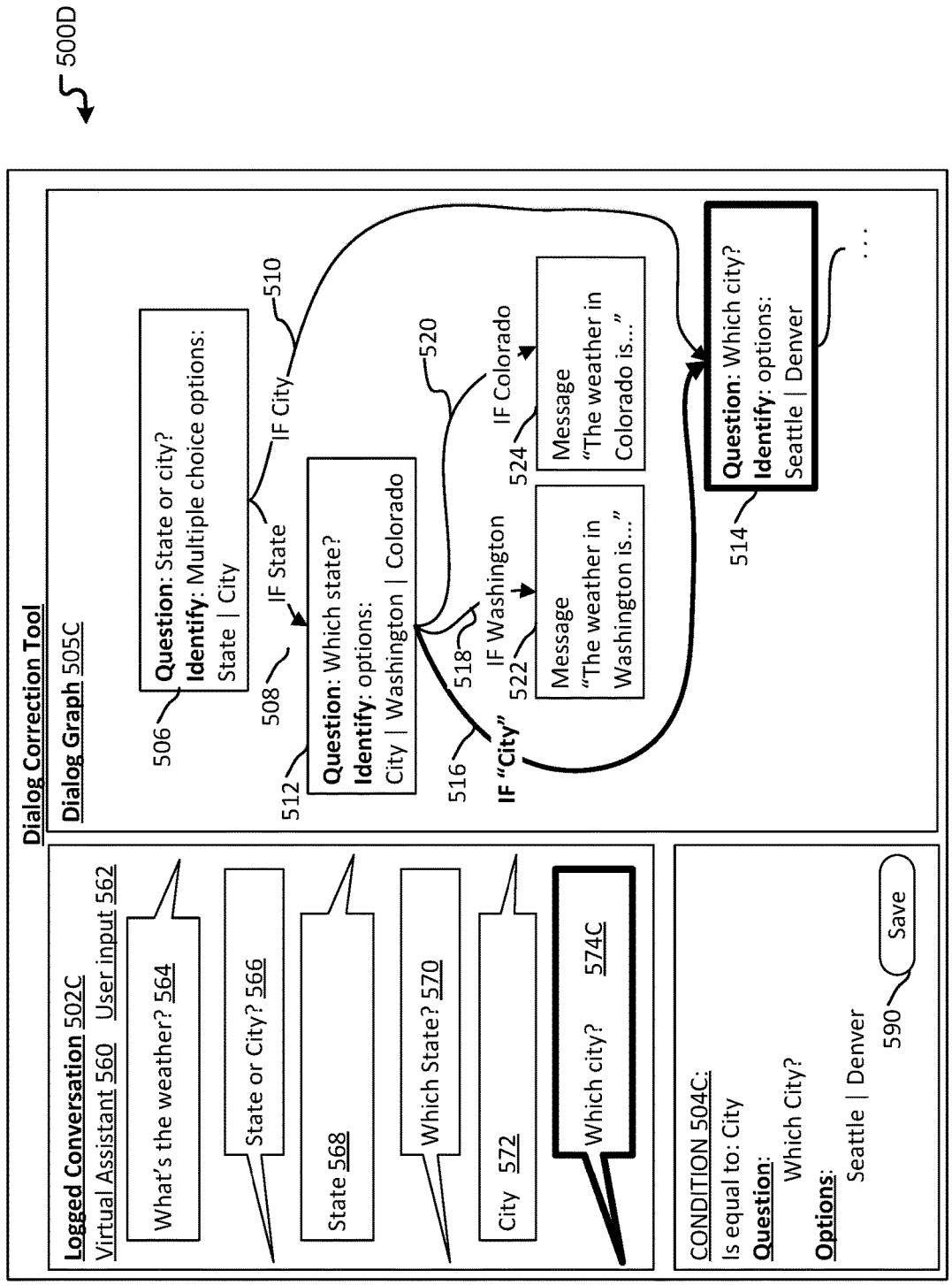

FIG. 5C illustrates an example user interface of the machine teaching UI (e.g., dialog editor 112). The example user interface 500C depicts an example graphical user interface in a window entitled, "Dialog Correction Tool," for editing a graph view of the logged conversation (e.g., log dialog). The window comprises three sub-windows, for example: a logged conversation sub-window 502B, a correction notification sub-window 504B, and a graph view sub-window 505B. The graph view displayed in sub-window 505B relates to the sequence of utterances (e.g., user inputs and virtual assistant outputs) in the logged conversation displayed in sub-window 502B. In some aspects, the Dialog Correction Tool window of FIG. 5B is displayed in response to user selection of interactive button 576, "Edit Dialog Tree," in sub-window 504A of FIG. 5A.

The logged conversation sub-window 502B may provide a complete or partial set of utterances associated with the logged conversation (e.g., log dialog). As illustrated, the logged conversation includes a sequential set of user inputs 562 and virtual assistant outputs 560. User input 564 queries, "What's the weather?" and virtual assistant output 566 clarifies, "State or city?" Then user input 568 indicates, "State," and the virtual assistant output 570 queries the user by asking a question, "Which state?" User input 572 responds, "City," and virtual assistant output 574 then states, "Sorry, I do not understand that State, 'City.'" The last output 574, which states, "Sorry, I do not understand that State, 'City,'" is highlighted because output 574 was determined to be an exception associated with an inaccurate response to user input 572.

The correction notification sub-window 504B provides for addressing the exception in the logged conversation by modifying the log dialog. In some aspects, sub-window 504B displays a condition that relates to the exception: "Is equal to: City." Sub-window 504B further provides an interactive button 578 "Update Dialog" for updating the graph view shown in sub-window 505B.

Sub-window 505B displays the graph view corresponding to the logged conversation, including the exception associated with output 574. In the example, the sub-window 505B displays a new edge 516 defined by condition "IF City" and an optional new node 526 connected to new edge 516. The optional new node 526 is available for the user to define a new action as a virtual assistant output when the condition "IF City" is satisfied. Additionally or alternatively, sub-window 505B may enable the user to interactively specify that the new edge 516 connects to an existing node associated with an action that has already been defined. For instance, new edge 516 may be edited to connect to third node 514.

FIG. 5D illustrates an example user interface of a machine teaching UI (e.g., dialog editor 112). The example user interface 500D depicts an example graphical user interface in a window entitled, "Dialog Correction Tool," for editing a graph view associated with a logged conversation (e.g., log dialog). The window comprises three sub-windows, for example: a logged conversation sub-window 502C, a condition notification sub-window 504C, and a graph view sub-window 505C. The graph view displayed in sub-window 505C corresponds to the sequence of utterances (e.g., user inputs and virtual assistant outputs) in the logged conversation displayed in sub-window 502C. In some aspects, the Dialog Correction Tool window in FIG. 5D is displayed when the user selects interactive button 578, "Update Dialog," in the correction notification sub-window 504B of FIG. 5C.

Sub-window 502C provides a complete or partial data of the log dialog. As illustrated, the logged conversation (e.g., log dialog) includes a sequential set of user inputs 562 and virtual assistant outputs 560. User input 564 queries, "What's the weather?" and virtual assistant output 566 clarifies, "State or city?" Then user input 568 indicates, "State," and the virtual assistant output 570 queries the user by asking a question, "Which state?" User input 572 responds, "City." However, in this case, the last virtual assistant output 574C, states "Which city?" Virtual assistant output 574C is highlighted because the virtual assistant output 574C is a corrected utterance to user input 572.

The condition notification sub-window 504C displays details of newly created edge 516 with a condition, "IF City," that addresses the exception in the logged conversation. In some aspects, sub-window 504C displays details of new edge 516. The details include the associated condition, "Is equal to: City." Additionally or alternatively, sub-window 504C may display a description of a new node or an existing node connected to new edge 516. In this example, instead of creating a new node, new edge 516 has been edited to connect to existing third node 514, which specifies a third action of asking a question, "Which city?" In some aspects, sub-window 504C displays an interactive button 590, "Save," to save the corrected graph view shown in sub-window 505C.

Sub-window 505C displays the corrected graph view associated with the corrected dialog (CD) displayed in sub-window 502C, which has addressed the exception identified in the logged conversation. In the example, sub-window 505C displays the new edge 516 (associated with condition "IF City") connected from second node 512 (associated with second action for asking question "Which state?") and to third node 514 (associated with third action for asking further question "Which city?"). In this way, the dialog graph is able to respond to a user input of, "City," following a virtual assistant output of "Which state?"

Figure 5E:
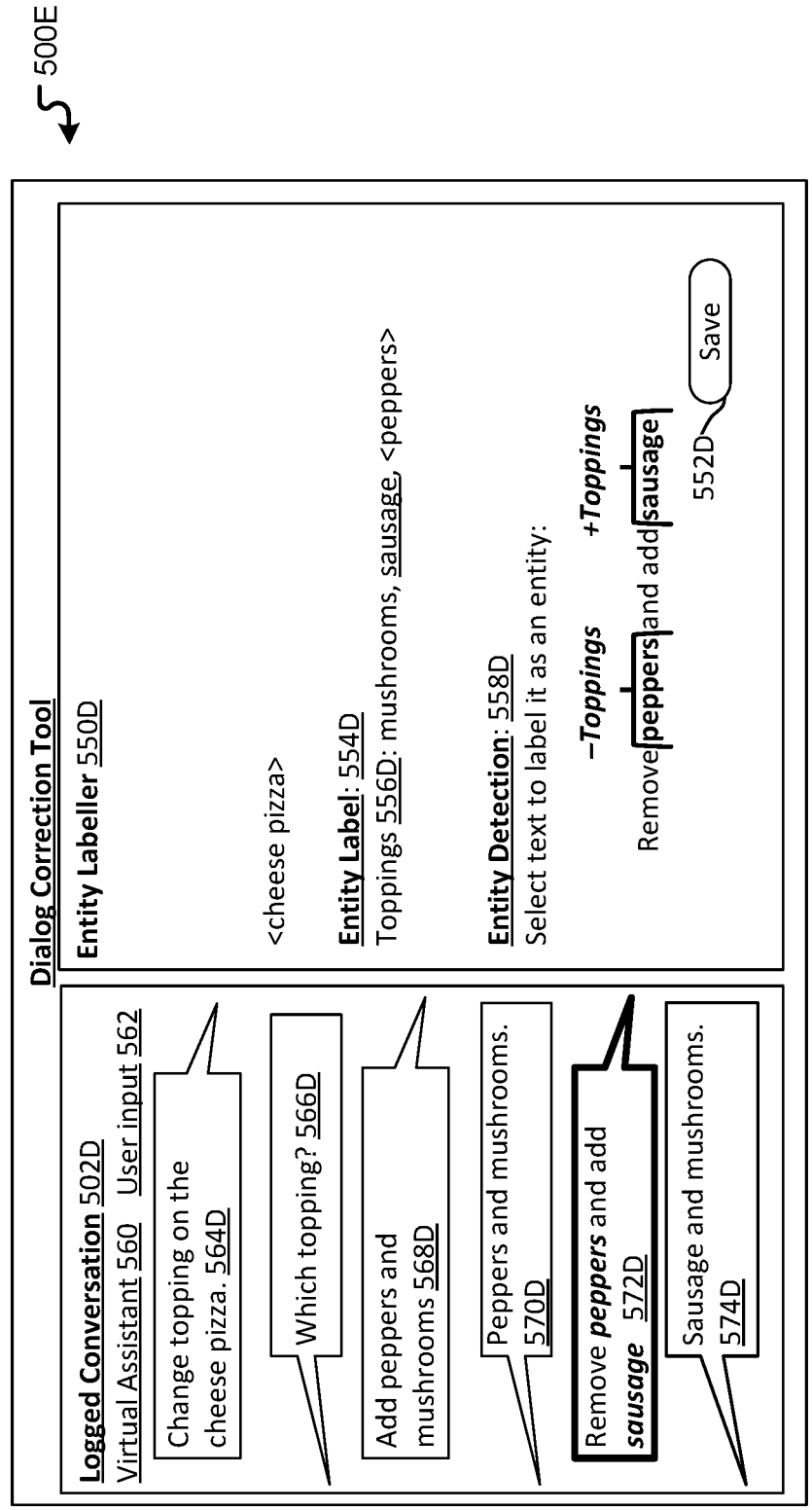

FIG. 5E illustrates an example user interface of a machine teaching UI (e.g., dialog editor 112). The example user interface 500E depicts an example graphical user interface UI in a window entitled, "Dialog Correction Tool," for editing entity labeling associated with utterance in a logged conversation (e.g., log dialog). The window comprises two sub-windows, for example: a logged conversation sub-window 502D and an entity labeler sub-window 550D. The entity labeler sub-window 550D displays entity mapping of a user input 572D "Remove peppers and sausage" by the virtual assistant outputs 560 in the logged conversation sub-window 502D. In some aspects, the Dialog Correction Tool window in FIG. 5E is displayed when the user selects one of utterance in the logged conversation sub-window 502A of FIG. 5B.

Sub-window 502D provides a complete or partial data of the log dialog. As illustrated the logged conversation (e.g., log dialog) includes a sequential set of user inputs 562 and virtual assistant outputs 560. Use input 564D commands "Change topping on the cheese pizza" and the virtual assistant output 566D responds "Which topping?" The user input 568D indicates, "Add peppers and mushrooms." The virtual assistant output 570D indicates "Peppers and mushrooms" to confirm the toppings. The user input 572D then provides "Remove peppers and add sausage." The virtual assistant output 574D then provides "Sausage and mushrooms." The user input 572D is highlighted as the user selects the user input 572D to interactively set entity labeling.

Sub-window 550D provides an interactive interface to label entities in a selected utterance. In aspects, entity label 554D indicates "Toppings" 556D of a cheese pizza as an entity label. The entity label "Toppings" 556D indicates entities "mushroom, {sausage}, <peppers>," indicating that "sausage" has been added and the entity "peppers" has been removed. Entity Detection 558D provides interactive selections of the entities "peppers" and "sausage" in the user input 572D "Remove peppers and add sausage." In some aspects, "—Toppings" indicates removing an entity from Toppings and "+Toppings" indicates adding an entity to Toppings. This way, entity labeling may be interactively modified to correct the log dialog. In some aspects, sub-window 550D displays an interactive button 552D, "Save," to save the corrected entity labeling shown in sub-window 550D.

As should be appreciated, the various methods, devices, applications, features, etc., described with respect to FIGS. 5A-E are not intended to limit the windows 500A-E to being performed by the particular applications and features described. Accordingly, additional controller configurations may be used to practice the methods and systems herein and/or features and applications described may be excluded without departing from the methods and systems disclosed herein.

FIG. 6 illustrates a schematic example of generating log dialogs for correction by machine teaching and subsequent retraining by machine learning according to an example system 600 in accordance with aspects of the present disclosure. In some aspects, the system 600 processes user inputs based on a deployed neural network and training dialogs to determine virtual assistant outputs. Log dialogs are generated to capture conversations between the users and the virtual assistant. In some aspects, system 600 may process the user inputs utilizing a predictor based on a trained machine learning system 601, a Hybrid Code Network (HCN), for example. A HCN machine learning system may comprise task-specific action templates, an entity processor and storage memory, a set of action masking rules, and a recurrent neural network. In other aspects, machine learning system 601 may be replaced by other types of machine learning systems. The machine learning system 601 may be trained based on GDs and CDs (collectively TDs) by dialog trainer 646 and the trained neural network may be deployed as a predictor to generate log dialogs 630 by determining (or predicting) responsive virtual assistant utterances to user input. In further aspects, system 600 may provide a dialog editor 634 for machine teaching, which enables a developer to edit the log dialogs to create corrected dialogs (CDs) 636 for retraining the neural network, for example, for implementing machine learning system 601.

Window 602 displays a conversation between a user and a virtual assistant. Window 602 may display a title of an application (e.g., "Weather Assistant") and a sequence of utterances, including user inputs and virtual assistant outputs. As illustrated, a user input 650 states "What's the weather?" and a virtual assistant output 652 responds with "Which city?" User input 654 responds with "The Big Apple" to specify a city. The virtual assistant may then provide weather information for the city specified by the user input. In this case, the virtual assistant output 656 provides the weather of New York City based on interpreting the user input 654 of "the Big Apple" as specifying New York City as the city.

In aspects, the received user input 650 ("What's the weather?") may be stored in a log dialog 630. Collectively, log dialogs 630 store a plurality of conversations (e.g., sequences of user inputs and virtual assistant outputs) resulting from the deployed neural network and training dialogs. Each of the plurality of conversations may also be referred to herein as a "logged conversation" or a "log dialog." To generate the log dialogs, utterance embedding 604 may embed words of a user input for use as an input to a recurrent neural network (RNN) 612, for example, and bag of Words vector 606 may generate multi-dimensional vectors that collectively represent words in the user input. The vectors may also be used as input to the recurrent neural network 612, for example. Entity extractor 608 may extract entities from the user input (e.g., user input 654, "The Big Apple"). In some aspects, the entity extractor 608 may detect entity mentions in the user input, may ground the entity mentions (e.g., by mapping an entity mention to a specific row in a dataset), and may perform entity substitution for a selected action template to produce a fully-formed action (e.g., by mapping the template "the weather of [city]?" to "the weather of New York City?" for example). The entity extractor 608 may also assign a phrase "Big Apple" as a value to a variable "$city" for example. Extraction call back (not shown in FIG. 6) may provide call backs based on the extracted entities for storing entity variables and values in memory 624. Entities in the memory 624 may also be used as input to the recurrent neural network 612.

Action masking rules 626 are rules for excluding classifications that are outside a predetermined subject domain as output from the recurrent neural network 612, which may output candidate responses that are irrelevant to specific subject domain associated with a dialog. In some aspects, the action masking rules 626 may be based on conditions of a rule-based dialog graph associated with the training dialogs. Each action mask represents an "if-then" rule that determines a set of valid actions for specific conditions. The action masking rules 626 may also be used as input to the recurrent neural network 612. Additionally or alternatively, the action masking rules 626 may be a filter applied to output of the recurrent neural network 612. In aspects, the recurrent neural network 612 is a type of neural network for processing user inputs to classify and determine likely candidate virtual assistant outputs. The recurrent neural network 612 may have been used to train dialogs by dialog trainer 646 (e.g., the dialog trainer 106, as described in FIG. 1, and for train operation 208 in FIG. 2).

For each turn in a TTD 123, a combination of features, including the user input embedding, the bag of words vector, and the set of extracted entities are concatenated to form a feature vector that is passed to the recurrent neural network 612, e.g., a Long Short Term Memory (LSTM) network. The recurrent neural network 612 computes a hidden state vector, which is retained for the next time step. Next, a softmax activation layer (not shown in FIG. 6) may be used to calculate a probability distribution over the available system action templates. An action mask rule may then be applied, and the result may be normalized (not shown in FIG. 6) to select the highest-probability action as the best response for the current turn. An example of a list of probability actions with respective probability values is shown in a list 618. When an action type of the highest-probability action is an API call type at a compare step 620, the API call 622 is made. Results from the API call, e.g., a weather forecast in New York City, may be stored in the memory 624 along with extracted entity data. The highest-probability action may then be provided as a virtual assistant output, e.g., providing a weather forecast for display on Weather Assistant Window 602, and the virtual assistant output may be stored in the log dialog 630.

In an example, log dialogs 630 may be created based on sequences of user inputs and virtual assistant outputs associated with Weather Assistant Window 602. Log dialogs 630 may be provided (via dashed flow 632) to dialog editor 634. In aspects, the dialog editor 634 may provide machine teaching, through a machine teaching user interface (UI), as described by FIGS. 5A-E, for example. In aspects, the dialog editor 634 (or another component or system) may identify one or more exceptions in the log dialogs 630. The one or more exceptions may represent poor responses made by the virtual assistant, for example. In aspects, the dialog editor 634 may display: the sequence of utterances from a log dialog 630 with emphasis on an exception in a response made by the virtual assistant, a list of candidate utterances for interactive selection to correct the exception in the log dialog 630, and a graph view to interactively change the rules and edit the log dialog 630. Based on the edited log dialog, the dialog editor 634 may generate a corrected dialog (CD) and provide the CD 636 to the dialog trainer 646 for retraining the recurrent neural network (RNN) 612.

As detailed above, the system 600 generates log dialogs 630 for correction by the dialog editor 634 (machine teaching) and subsequent retraining by the dialog trainer 646 for machine learning. In aspects, the operations of the system 600 relate to the method of generating a log dialog, as described in FIG. 3. The log dialog 630 as created through operations in the system 600 may be used for identifying an exception in the log dialog, as described in the identify operation 210 and for editing the log dialog and for creating a CD, as described in the create operation 212 in FIG. 2. Generating the log dialogs by deploying the TTDs 123 to generate actual user interactions with the virtual assistant reduces a burden on developers to design new sample dialogs for training. Instead, the developer (or a teacher) may review the log dialogs to correct an exception using a tool, such as the Machine Teaching UI (e.g., the dialog editor 634). The dialog editor 634 (machine teaching) may output a corrected dialog (CD 636). Additionally or alternatively, the dialog editor 634 (machine teaching) may output a graph view for a developer to edit or generate a rule-based graph 640 using a rule-based dialog Graph UI (e.g., the rule-based dialog graph UI 102 in FIG. 2). The dialog converter 642 (e.g., the dialog converter 104 in FIG. 1) may convert the rule-based graph 640 into a set of generated dialogs (GDs) 644.

As should be appreciated, the various methods, devices, applications, features, etc., described with respect to FIG. 6 is not intended to limit the system 600 to being performed by the particular applications and features described. Accordingly, additional controller configurations may be used to practice the methods and systems herein and/or features and applications described may be excluded without departing from the methods and systems disclosed herein.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the processing unit 702, the program tools 706 (e.g., entity-activity relationship application 720) may perform processes including, but not limited to, the aspects, as described herein. The conversation learner application 720 includes a dialog converter 730, a dialog trainer 732, a log dialog provider 734, a log dialog generator 736, and a machine teacher 738 as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client (e.g., computing systems 105 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server, a mobile computing device, etc. That is, the computing device 800 can incorporate a system 802 (additionally or alternatively an architecture) to implement some aspects. The system 802 can be implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 869 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape.

Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In aspects, a computer-implemented method for correcting a dialog is provided. The method includes receiving a dialog graph comprising a plurality of paths and converting each path of the dialog graph into a text-based dialog to generate a plurality of text-based dialogs. The method further includes training a neural network based on the plurality of text-based dialogs and receiving a log dialog based on deploying the trained neural network. Additionally, the method includes identifying an exception in the log dialog and receiving an edit to the log dialog to mitigate the exception and to create a corrected dialog. The method further includes retraining the trained neural network based at least on the corrected dialog.

In further aspects, a system is provided. The system includes a processor and memory storing computer-executable instructions that, when executed by the processor, cause the system to receive a dialog graph comprising a plurality of paths and translate each path of the dialog graph into a dialog to generate a plurality of dialogs. The computer-executable instructions when executed by the processor further cause the system to train a neural network based on the plurality of dialogs and deploy the trained neural network to generate a log dialog of user-system interactions. Additionally, the computer-executable instructions when executed by the processor cause the system to identify an exception associated with the log dialog and receive an edit to the dialog graph to mitigate the exception. The computer-executable instructions when executed by the processor further cause the system to translate each path of the edited dialog graph to generate a revised plurality of dialogs and retrain the neural network based on the revised plurality of dialogs.

In still further aspects, a computer storage medium storing computer-executable instructions that when executed a processor cause a computer system to receive a log dialog generated by a machine learning system, where the log dialog includes at least one user input and at least one system response, and cause display of the log dialog in a machine-teaching tool of a user interface. The computer-executable instructions when executed by the processor further cause the computer system to provide an indication of an exception in the log dialog, where the exception is associated with the at least one system response, and receive an edit to the log dialog to mitigate the exception. Additionally, the computer-executable instructions when executed by the processor cause the computer system to retrain the machine learning system based on the edited log dialog.

Any of the one or more above aspects in combination with any other of the one or more aspect. Any of the one or more aspects as described herein.

What is claimed is:

1. A computer-implemented method for correcting a dialog, the method comprising:
    receiving a first dialog graph comprising a plurality of nodes and at least one edge connecting two nodes of the plurality of nodes, wherein the first dialog graph represents a dialog flow including each of the plurality of nodes defining an action associated with the corresponding node and the at least one edge defining a condition linking the two nodes, wherein a first path connects at least a first preceding node to at least a first subsequent node of the plurality of nodes through one or more edges, and wherein a second path connects at least the first preceding node to at least a second subsequent node of the plurality of nodes;
    converting the first path of the first dialog graph into a first text-based dialog and the second path of the first dialog graph into a second text-based dialog, wherein the first text-based dialog and the second text-based dialog are in a data format adapted for training a neural network and represent the dialog flow of the first dialog graph;
    training the neural network based at least on the first text-based dialog and the second text-based dialog as training data;
    receiving a log dialog, wherein the log dialog is generated based on executing the neural network to deploy a dialog, wherein a conversation thread associated with the deployed dialog is included in the log dialog;
    identifying an exception in the log dialog;
    converting at least a portion of the log dialog into a second dialog graph;
    receiving an edit directly to the conversation thread of the deployed dialog in the log dialog via an interactive dialog editor tool to mitigate the exception and to create a corrected dialog;
    retraining the neural network based at least on the corrected dialog; and
    updating the second dialog graph associated with the log dialog based on the corrected dialog.

2. The computer-implemented method of claim 1, wherein the neural network is retrained based at least on the first and second text-based dialogs and the corrected dialog.

3. The computer-implemented method of claim 1, wherein the log dialog comprises at least one user input and at least one system response.

4. The computer-implemented method of claim 3, wherein the identified exception is associated with the at least one system response.

5. The computer-implemented method of claim 1, the method further comprising:
 receiving an edit to the second dialog graph to mitigate the exception and to create a corrected dialog graph;
 converting each path of the corrected dialog graph into a corrected text-based dialog to generate a plurality of corrected text-based dialogs; and
 training the neural network based on the plurality of corrected of text-based dialogs.

6. The computer-implemented method of claim 5, wherein the edit to the second dialog graph comprises creating at least one of a new edge or a new node in the second dialog graph.

7. The computer-implemented method of claim 1, wherein the at least one edge represents a condition for traversing the first path from the first preceding node to the first subsequent node.

8. The computer-implemented method of claim 7, wherein the first preceding node is associated with a system action, and wherein the system action comprises one of: asking a question, providing a message, calling an application programing interface (API), or constructing a sentence based on a template card with entity values.

9. The computer-implemented method of claim 1, further comprising:
 providing a user interface, wherein the user interface comprises a tool for receiving the edit to the log dialog.

10. A system comprising:
 at least one processor; and
 at least one memory storing computer-executable instructions that when executed by the at least one processor cause the system to:
  receive a first dialog graph comprising a plurality of nodes and at least one edge connecting two nodes of the plurality of nodes, wherein the first dialog graph represents a dialog flow including each of the plurality of nodes defining an action associated with the corresponding node and the at least one edge defining a condition linking the two nodes, wherein a first path connects at least a first preceding node to at least a first subsequent node of the plurality of nodes through one or more edges, and wherein a second path connects at least the first preceding node to at least a second subsequent node of the plurality of nodes;
  translate the first path of the first dialog graph into a first text-based dialog and the second path of the first dialog graph into a second text-based dialog, wherein the first text-based dialog and the second text-based dialog are in a data format adapted for training a neural network and represent the dialog flow of the first dialog graph;
  train the neural network based at least on the first text-based dialog and the second text-based dialog as training data;
  deploy the neural network to generate a log dialog of deployed user-system interactions, wherein at least one deployed dialog is included in the log dialog;
  identify an exception associated with the deployed dialog in the log dialog;
  convert at least a portion of the log dialog into a second dialog graph;
  receive an edit directly to the log dialog via an interactive dialog editor tool to mitigate the exception and to create a corrected dialog;
  retrain the neural network based on the plurality of corrected dialog;
  update the second dialog graph associated with the log dialog based on the corrected dialog.

11. The system of claim 10, wherein the neural network is a recurrent neural network.

12. The system of claim 10, wherein the log dialog comprises at least one user input and at least one system response.

13. The system of claim 10, wherein the at least one edge represents a condition for traversing the first path from the first preceding node to the first subsequent node.

14. The system of claim 10, further comprising instructions stored thereon that, when executed by the at least one processor, causes the system to:
 receive a second edit to the second dialog graph to mitigate the exception and to create a corrected dialog graph;
 convert each path of the corrected dialog graph into a corrected text-based dialog to generate a plurality of corrected text-based dialogs; and
 train the neural network based on the plurality of corrected of text-based dialogs,
 wherein the second edit to the second dialog graph comprises creating at least one of a new edge or a new node in the second dialog graph.

15. A computer storage medium storing computer-executable instructions that when executed a processor cause a computer system to:
 receive a first dialog graph comprising a plurality of nodes and at least one edge connecting two nodes of the plurality of nodes, wherein the first dialog graph represents a dialog flow including each of the plurality of nodes defining an action associated with the corresponding node and the at least one edge defining a condition linking the two nodes, wherein a first path connects at least a first preceding node to at least a first subsequent node of the plurality of nodes through one or more edges, and wherein a second path connects at least the first preceding node to at least a second subsequent node of the plurality of nodes;
 convert the first path of the first dialog graph into a first text-based dialog and the second path of the first dialog graph into a second text-based dialog, wherein the first text-based dialog and the second text-based dialog are in a data format adapted for training a machine learning system and represent the dialog flow of the first dialog graph;
 train the machine learning system based at least on the first text-based dialog and the second text-based dialog as training data;
 receive a log dialog, wherein the log dialog is generated based on executing the machine learning system to deploy a dialog, wherein a conversation thread associated with the deployed dialog is included in the log dialog;
 cause display of the log dialog in a machine-teaching tool of a user interface;
 convert at least a portion of the log dialog into a second dialog graph;
 provide an indication of an exception in the log dialog, wherein the exception is associated with the deployed dialog;

receive an edit directly to the conversation thread of the deployed dialog in the log dialog via an interactive dialog editor tool to mitigate the exception;

retrain the machine learning system based on the edited log dialog;

update the second dialog graph associated with the log dialog based on a corrected dialog.

16. The computer storage medium of claim 15, the computer-executable instructions when executed further causing the computer system to:

cause display of one or more recommendations for mitigating the exception based on the machine-teaching tool; and receive a selection of at least one recommendation to edit the log dialog to mitigate the identified exception.

17. The computer storage medium of claim 15, wherein the machine-teaching tool is a neural network.

18. The computer storage medium of claim 15, wherein the retrained machine learning system is used to update the second dialog graph.

\* \* \* \* \*